US010697938B2

(12) United States Patent
Cattaneo et al.

(10) Patent No.: US 10,697,938 B2
(45) Date of Patent: Jun. 30, 2020

(54) FLUID CHARACTERIZATION USING ACOUSTICS

(71) Applicants: TRIAD NATIONAL SECURITY, LLC, Los Alamos, NM (US); Chevron U.S.A. Inc., San Ramon, CA (US)

(72) Inventors: Alessandro Cattaneo, Los Alamos, NM (US); Dipen N. Sinha, Los Alamos, NM (US); Todd Andrew Jankowski, Los Alamos, NM (US); James Schrodt, San Ramon, CA (US)

(73) Assignees: Triad National Security, LLC, Los Alamos, NM (US); Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 16/494,663

(22) PCT Filed: Mar. 15, 2018

(86) PCT No.: PCT/US2018/022741
§ 371 (c)(1),
(2) Date: Sep. 16, 2019

(87) PCT Pub. No.: WO2018/170323
PCT Pub. Date: Sep. 20, 2018

(65) Prior Publication Data
US 2020/0096484 A1  Mar. 26, 2020

Related U.S. Application Data

(60) Provisional application No. 62/472,377, filed on Mar. 16, 2017.

(51) Int. Cl.
*G01N 29/02* (2006.01)
*G01N 29/22* (2006.01)
(Continued)

(52) U.S. Cl.
CPC .......... *G01N 29/222* (2013.01); *G01N 29/02* (2013.01); *G01N 29/245* (2013.01); *G01N 29/28* (2013.01);
(Continued)

(58) Field of Classification Search
CPC .................. G01N 29/222; G01N 29/2437
See application file for complete search history.

(56) References Cited

U.S. PATENT DOCUMENTS 5,130,950 A * 7/1992 Orban .................. E21B 47/082
                                                      367/34
5,214,251 A * 5/1993 Orban ..................... E21B 21/08
                                                      181/102
(Continued)

FOREIGN PATENT DOCUMENTS

WO   WO-2016/010559 A1   1/2016

OTHER PUBLICATIONS

International Searching Authority, International Search Report and Written Opinion for International Application No. PCT/US2018/022741, dated Jul. 9, 2018, U.S. Patent and Trademark Office, USA.
(Continued)

*Primary Examiner* — Paul M. West
*Assistant Examiner* — Mark A Shabman
(74) *Attorney, Agent, or Firm* — Alston & Bird LLP

(57) ABSTRACT

A measurement system and a method for determining steam quality (i.e. vapor mass fraction) measurements of multiphase fluid flowing through pipes are described. An acoustic sensor device consists of an acoustic transmitter and an acoustic receiver that are designed to be attached to a pipe. The acoustic transmitter and the acoustic receiver are exposed to an interior space of the pipe through openings in a wall of the pipe. Acoustic waves generated by the transmitter and captured by the receiver traverse the multiphase fluid flowing into the pipe. Swept-frequency acoustic interferometry (SFAI) technique is used to measure ultrasonic acoustic properties of a fluid. Machine-learning techniques based on principal component analysis, support vector
(Continued)

machine regression and support vector machine classification are used for determining steam quality.

20 Claims, 14 Drawing Sheets

(51) Int. Cl.
*G01N 29/24* (2006.01)
*G01N 29/28* (2006.01)
*G01N 29/44* (2006.01)
*G01N 29/32* (2006.01)

(52) U.S. Cl.
CPC ......... *G01N 29/323* (2013.01); *G01N 29/326* (2013.01); *G01N 29/4418* (2013.01); *G01N 2291/021* (2013.01); *G01N 2291/048* (2013.01); *G01N 2291/102* (2013.01)

(56) References Cited

U.S. PATENT DOCUMENTS

| | | | |
|---|---|---|---|
| 5,767,407 A | 6/1998 | Sinha | |
| 6,047,602 A | 4/2000 | Lynnworth | |
| 8,117,907 B2 * | 2/2012 | Han | E21B 47/082 |
| | | | 73/152.58 |
| 8,525,986 B2 * | 9/2013 | Dutel | G06F 30/00 |
| | | | 356/246 |
| 8,640,529 B2 | 2/2014 | Sinha | |
| 8,820,147 B2 | 9/2014 | Sinha | |
| 2003/0051558 A1 | 3/2003 | Melnikov et al. | |
| 2004/0095847 A1 | 5/2004 | Hassan et al. | |
| 2005/0044966 A1 * | 3/2005 | Gysling | G01F 1/662 |
| | | | 73/861.26 |
| 2005/0173185 A1 | 8/2005 | Pabon et al. | |
| 2006/0096105 A1 * | 5/2006 | Haugland | E21B 47/022 |
| | | | 33/304 |
| 2009/0022011 A1 | 1/2009 | Mickael et al. | |
| 2011/0073368 A1 | 3/2011 | Han et al. | |

OTHER PUBLICATIONS

Li, Huidong et al. *Design Parameters of a Miniaturized Piezoelectric Underwater Acousting Transmitter*, Sensors, vol. 12, No. 7, (2012), pp. 9098-9109. [Retrieved from the Internet Aug. 21, 2019] <https://www.mdpi.com/1424-8220/12/7/9098>.

* cited by examiner

FLUID CHARACTERIZATION USING ACOUSTICS

CROSS REFERENCE TO RELATED APPLICATIONS

The present application is a National Stage Application, filed under 35 U.S.C. § 371, of International Application No. PCT/US2018/022741, filed Mar. 15, 2018, which application claims priority under 35 U.S.C. Section 119(e) to U.S. Provisional Patent Application No. 62/472,377, filed Mar. 16, 2017 and titled "Fluid Characterization Using Acoustics," the entire content of both of which as are incorporated herein by reference.

ACKNOWLEDGMENT OF GOVERNMENT SUPPORT

This invention was made with government support under Contract No. DE-AC52-06NA25396 awarded by the U.S. Department of Energy. The government has certain rights in the invention.

PARTIES TO JOINT RESEARCH AGREEMENT

The research work described here was performed under a Cooperative Research and Development Agreement (CRADA) between Los Alamos National Laboratory (LANL) and Chevron under the LANL-Chevron Alliance, CRADA number LA05C10518.

FIELD OF THE INVENTION

The field of the invention relates to the characterization of multiphase fluids using acoustics.

BACKGROUND

In many industrial activities, such as the production of oil and gas from underground reservoirs, fluids flow through pipes to and from reservoirs. It is sometimes desirable to characterize such fluids in a minimally invasive manner. For example, characterizing a multiphase fluid (e.g., two phase fluid) flowing through a pipe to determine/estimate the quality (i.e., vapor mass fraction) and/or flow rate of fluid may be desirable. One manner of investigating and characterization of a multiphase stream involves acoustics, or sound waves. For example, the technique of swept-frequency acoustic interferometry (SFAI) can be used to characterize a multiphase fluid. By generating sound waves of different frequencies (i.e., sweeping the frequency) that are introduced into the fluid carrying pipe one at a time, the characteristics of the multiphase fluid may be determined/estimated.

In some applications, the multiphase fluid flowing through a pipe may be under relatively high pressure and/or high temperature. For example, the fluid flowing through a pipe may be partially liquid and partially vapor (e.g., liquid water and steam). Thus, a fluid characterization device, system, and process that can be used in acoustic characterization of a fluid that is under relatively high pressure and/or high temperature may be desirable.

SUMMARY

The present disclosure relates to the characterization of multiphase fluids using acoustics. In an example embodiment, an acoustic sensor device includes an acoustic transmitter that includes a transmitter piezoelectric transducer (PZT), a transmitter plate, and a transmitter standoff positioned between the transmitter PZT and the transmitter plate. The acoustic sensor device further includes an acoustic receiver that includes a receiver PZT, a receiver plate, and a receiver standoff positioned between the receiver PZT and the receiver plate. The acoustic transmitter and the acoustic receiver are each designed to be attached to a pipe such that the transmitter plate and the receiver plate are exposed to an interior space of the pipe through openings in a wall of the pipe.

In another example embodiment, an acoustic sensor device includes a pipe and an acoustic transmitter that includes a transmitter piezoelectric transducer (PZT), a transmitter plate, and a transmitter standoff positioned between the transmitter PZT and the transmitter plate. The acoustic sensor device further includes an acoustic receiver that includes a receiver PZT, a receiver plate, and a receiver standoff positioned between the receiver PZT and the receiver plate. The transmitter plate is exposed to an interior space of the pipe through a first opening in a wall of the pipe, and the receiver plate is exposed to the interior of the pipe through a second opening in the wall of the pipe. The first opening and the second opening are across from each other.

In yet another example embodiment, a system for characterizing a multiphase fluid flowing through a pipe includes a digital function generator, a power amplifier with a first controllable gain, a preamplifier with a second controllable gain, a digital oscilloscope, and a computer configured to execute a software code to manage communication with the digital function generator and the digital oscilloscope and to implement signal post-processing techniques for extraction of information from recorded signals to characterize a multiphase fluid. The system further includes an acoustic sensor device that includes a pipe, and an acoustic transmitter that includes a transmitter piezoelectric transducer (PZT), a transmitter plate, and a transmitter standoff positioned between the transmitter PZT and the transmitter plate. The acoustic sensor device may further include an acoustic receiver comprising a receiver PZT, a receiver plate, and a receiver standoff positioned between the receiver PZT and the receiver plate, where the transmitter plate is exposed to an interior space of the pipe through a first opening in a wall of the pipe and where the receiver plate is exposed to the interior of the pipe through a second opening in the wall of the pipe.

In yet another example embodiment, a method for steam quality measurement includes receiving, by an electrical signal receiver, electrical signals generated by an acoustic receiver of an acoustic sensor device and processing, by the electrical signal receiver, the electrical signals to generate a training data set. The method further includes processing, by a processor, the training data set, where processing the training data set includes performing principal component analysis on the training data set to generate principal component parameters. The method may also include training, by the processor, a support vector machine (SVM) regression model to generate a trained SVM regression model using one or more of the principal component parameters and a subset of the known steam quality values and estimating a steam quality of a fluid flowing through the device based on the trained SVM regression model.

In yet another example embodiment, a method for steam quality measurement includes receiving, by an electrical signal receiver, electrical signals generated by an acoustic receiver of an acoustic sensor device and processing, by the electrical signal receiver, the electrical signals to generate a training data set. The method further includes processing, by a processor, the training data set, where processing the training data set includes performing principal component analysis on the training data set to generate principal component parameters. The method may also include training, by the processor, a support vector machine (SVM) classification model to generate a trained SVM classification model using one or more of the principal component parameters and steam quality labels and estimating a steam quality label of a fluid flowing through the device based on the trained SVM classification model.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein.

Figure 1:
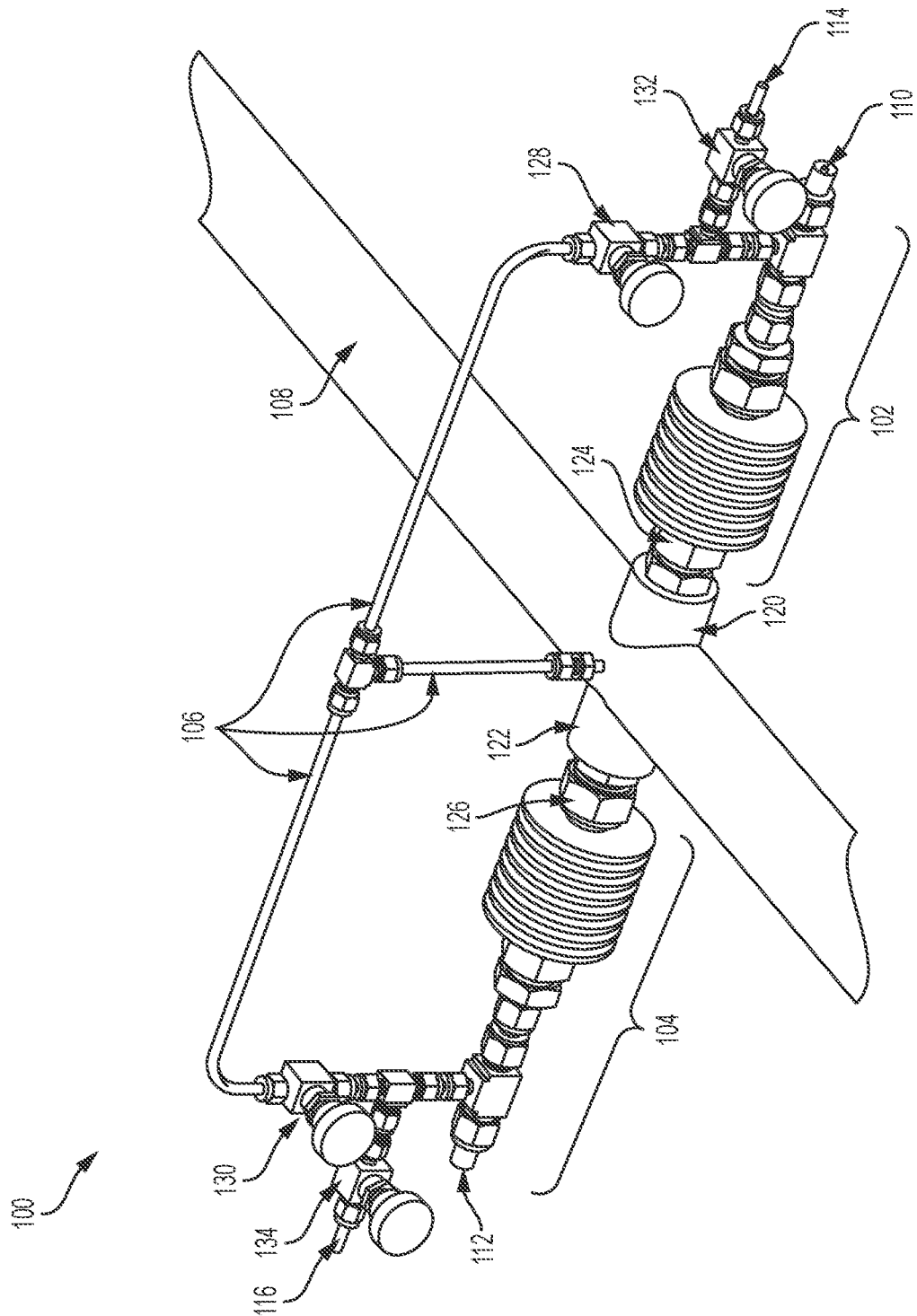
FIG. 1 illustrates an acoustic sensor device for measuring the acoustic properties of a multiphase fluid flowing through a pipe according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In a multiphase (e.g., a two-phase) fluid such as a liquid water and vapor mixture, sound traveling through the fluid is affected by the vapor quality (i.e., vapor mass fraction) of the fluid. In some example applications, the multiphase fluid may be a steam that is a mixture of liquid water and vapor with a large volumetric vapor fraction. In some other example applications, the multiphase fluid may be a mixture of oil, liquid water and water vapor. In yet other embodiments, the multiphase fluid may have other constituents. For example, the multiphase fluid may be a mixture of oil, hydrocarbon gases, liquid water, and water vapor. In some example embodiments, some solid elements (e.g., sand) may be included with the multiphase fluid.

To illustrate, acoustic vibrations from a transmitting transducer may be sent through a multiphase fluid flowing through a pipe and may be detected by a receiving transducer that is positioned to receive the acoustic vibrations through the multiphase fluid. The acoustic characteristics of the fluid flowing through the pipe may be measured based on acoustic signal/wave/vibration transmitted and detected. The vapor quality of the fluid flowing through a pipe may be determined/estimated based on the acoustic characteristics of the fluid. For example, an electrical signal received from a receiving transducer may be analyzed against known data to determine the vapor quality of the fluid. In general, the SFAI technique may be used to determine the acoustic characteristics of the fluid flowing through a pipe. For example, the SFAI technique may be used to determine sound velocity information as a function of frequency in a single sweep measurement.

Turning to the drawings, FIG. 1 illustrates an acoustic sensor device 100 for measuring the acoustic properties of a multiphase fluid flowing through a pipe according to an example embodiment. The device 100 includes an acoustic transmitter 102 and an acoustic receiver 104. In some example embodiments, the acoustic sensor device 100 further includes a pressure compensator 106 and a pipe 108. The acoustic transmitter 102 is coupled to the pipe 108 on a first side of the pipe, and the acoustic receiver 104 is coupled to the pipe 108 on an opposite side of the pipe 108. The acoustic transmitter 102 and the acoustic receiver 104 are attached to the pipe 108 such that a plate of each sensor component 102, 104 is exposed to the fluid flowing through the pipe 108 as described below.

To illustrate, a branch connection 120 may be attached to the pipe 108 at an opening in the wall of the pipe 108, and a branch connection 122 may be attached to the pipe 108 at another opening in the wall of the pipe 108 opposite the branch connection 120. For example, the acoustic transmitter 102 may be attached to the first branch connection 120 using a fitting adapter 124, and the acoustic receiver 104 may be attached to the second branch connection 122 using a fitting adapter 126. The fitting adapters 124, 126 may each have outer threads to be fittingly threaded into the branch connections 120, 122 such that a fluid flowing through the pipe 108 cannot escape through the branch connections (e.g., weldolets) 120, 122. In some alternative embodiments, the acoustic transmitter 102 and the acoustic receiver 104 may be attached to the pipe 108 without the use of the branch connections 120, 122 and/or the fitting adapters 124, 126 without departing from the scope of this disclosure. In some example embodiments, the pipe 108 may be an ASTM A106 carbon steel pipe or another type of pipe suitable for a particular application. The fitting adapters 124, 126 may be made from stainless steel or another suitable material. For example, the fitting adapters 124, 126 may be SWAGELOK fitting adapters.

In some example embodiments, the acoustic transmitter 102 includes a connector (e.g., a BNC) 110 for connecting to a connector of an electrical cable that provides an electrical signal (e.g., an excitation signal) to the acoustic transmitter 102 as described below. The acoustic transmitter 102 may also include an interface 114 for connecting to a vacuum pump that is used to remove air from the acoustic transmitter 102 during the assembly of the acoustic sensor device 100.

In some example embodiments, the acoustic receiver 104 includes a connector (e.g., a BNC) 112 for connecting to a connector of another electrical cable that carries an electrical signal from the acoustic receiver 104 as described below. The acoustic receiver 104 may also include an interface 116 for connecting to a vacuum pump that is used to remove air from the acoustic receiver 104 during the assembly of the acoustic sensor device 100.

In some example embodiments, the acoustic transmitter 102 and the acoustic receiver 104 may be filled with a heat transfer fluid that provides improved acoustic coupling, prevents the fluid flowing through the pipe 108 from occupying the inside of the acoustic transmitter 102 and the acoustic receiver 104 when they are connected to the pressure compensator 106, and helps with heat dissipation as described below. In general, the heat transfer fluid is a low vapor pressure fluid capable of continuous operation at relatively high temperatures. For example, Therminol® 66, which has a very low vapor pressure and can continuously operate at 650 degrees Fahrenheit, may be used as the heat transfer fluid in both the acoustic transmitter 102 and the acoustic receiver 104. In some alternative embodiments, another heat transfer fluid with a higher vapor pressure and a lower temperature tolerance than those of Therminol® 66 may be used in some embodiments.

In some example embodiments, the heat transfer fluid may be put in the acoustic transmitter 102 through a valve 128 after air is removed from the acoustic transmitter 102 through a valve 132 via the interface 114 using a vacuum pump. Similarly, the heat transfer fluid may be put in the acoustic receiver 104 through a valve 130 after air is removed from the acoustic receiver 104 through a valve 134 via the interface 116 using a vacuum pump. For example, the valves 128, 130 may be closed and the valves 132, 134 may be open to remove air from the acoustic transmitter 102 and the acoustic receiver 104.

After air is removed from the acoustic transmitter 102 and the acoustic receiver 104, the valves 132, 134 may be closed and the valves 128, 130 may be opened to fill the acoustic transmitter 102 and the acoustic receiver 104 with the heat transfer fluid. The valves 128, 130 may be closed prior to attaching the pressure compensator 106 and may be opened after the pressure compensator 106 is attached to the valves 128, 130 to establish a fluid passageway between the acoustic transmitter 102, the acoustic receiver 104, and the pipe 108 through the piping of the pressure compensator 106. The pressure compensator 106 is connected to the pipe 108 via an opening in the wall of the pipe 108. The pressure compensator 106 enables the balancing of pressure between fluid flowing through the pipe 108 and the sensor components 102, 104. In some alternative embodiments, the pressure compensator 106 may be connected to the pipe 108, acoustic transmitter 102, and acoustic receiver 104 at different locations and may be oriented differently than shown in FIG. 1 without departing from the scope of this disclosure. The pressure compensator 106 may be made from a material (e.g., stainless steel) that is capable of operating under relatively high pressure and temperature.

In some example embodiments, the pipe 108 is attached between two segments of a pipeline such that a multiphase fluid that flows through the pipeline seamlessly flows from one segment to the other segment of the pipeline through the pipe 108. For example, a segment of an existing pipeline may be removed from the pipeline and replaced by the pipe 108. Alternatively, the pipe 108 may be a segment of an existing pipeline that is removed from the pipeline and attached (e.g., welded) back to the pipeline after the acoustic transmitter 102, the acoustic receiver 104, and the pressure compensator 106 are attached to the pipe 108 as shown in FIG. 1.

In some alternative embodiments, the pipe 108 may be omitted from the acoustic sensor device 100. To illustrate, instead of being part of the acoustic sensor device 100, the pipe 108 may be a part of a pipeline to which the branch connections 120, 122 are welded as shown in FIG. 1. In such alternative embodiments, the acoustic sensor device 100 includes the acoustic transmitter 102, the acoustic receiver 104, and the pressure compensator 106 that are to be attached to a part of an existing pipeline.

In general, the acoustic transmitter 102 and the acoustic receiver 104 include the same components and are capable of performing the same function. As arranged in FIG. 1, the acoustic transmitter 102 and the acoustic receiver 104 may be used in the SFAI pitch/catch arrangement. The acoustic transmitter 102 may generate an acoustic wave in the fluid flowing through the pipe 108, and the acoustic wave may be received by the acoustic receiver 104. To illustrate, the sensor components 102, 104 are mounted to the pipe 108 such that the plate (e.g., the plate 214 shown in FIG. 2) faces the corresponding plate of the acoustic receiver 104 across the interior space of the pipe 108.

As described below with respect to FIG. 2, each of the sensor components 102, 104 includes a PZT. The acoustic transmitter 102 may generate the acoustic wave based on an electrical signal provided to the PZT of the acoustic transmitter 102 via the connector 110. The PZT of the acoustic receiver 104 may generate an electrical signal based on the acoustic wave received from the acoustic transmitter 102 via the plate of the acoustic receiver 104 and may provide the electrical signal to an electrical signal receiver (e.g., a digital oscilloscope) via the connector 112.

In some example embodiments, the acoustic sensor device 100 may be used to measure the acoustic properties of steam flowing through the pipe 108 at elevated pressures (e.g., 300-1500 psig) present in industrial applications. For example, the measured acoustic properties may be used to determine/estimate the steam quality (i.e., percentage of vapor) of the steam flowing through the pipe 108. Determining steam quality is important in many applications. For example, with respect to oil and gas productions, knowing the quality of steam provided to a reservoir and returning back from the reservoir in a multiphase fluid that may include oil, hydrocarbon gases, liquid water, water vapor, etc. enables improvement in the efficiency of controlling the amount of steam provided to a reservoir, which can result significant cost savings. In some alternative embodiments, the acoustic sensor device 100 of FIG. 1 may be used to determine the acoustic properties of fluids other than steam without departing from the scope of this disclosure.

In some alternative embodiments, some of the components of the acoustic transmitter 102 and the acoustic receiver 104 may omitted, replaced, or combined without departing from the scope of this disclosure. For example, one or more of the valves 128, 132, 130, 134 may be omitted or replaced with other structures without departing from the scope of this disclosure. In some example embodiments, the pipe 108 may include flanges at its open ends for attaching the pipe 108 to other pipes such that a multiphase fluid flows from one pipe to another pipe through the pipe 108. Alternatively, the pipe 108 may be attached to one or more other pipes by other means without departing from the scope of this disclosure.

Figure 2:
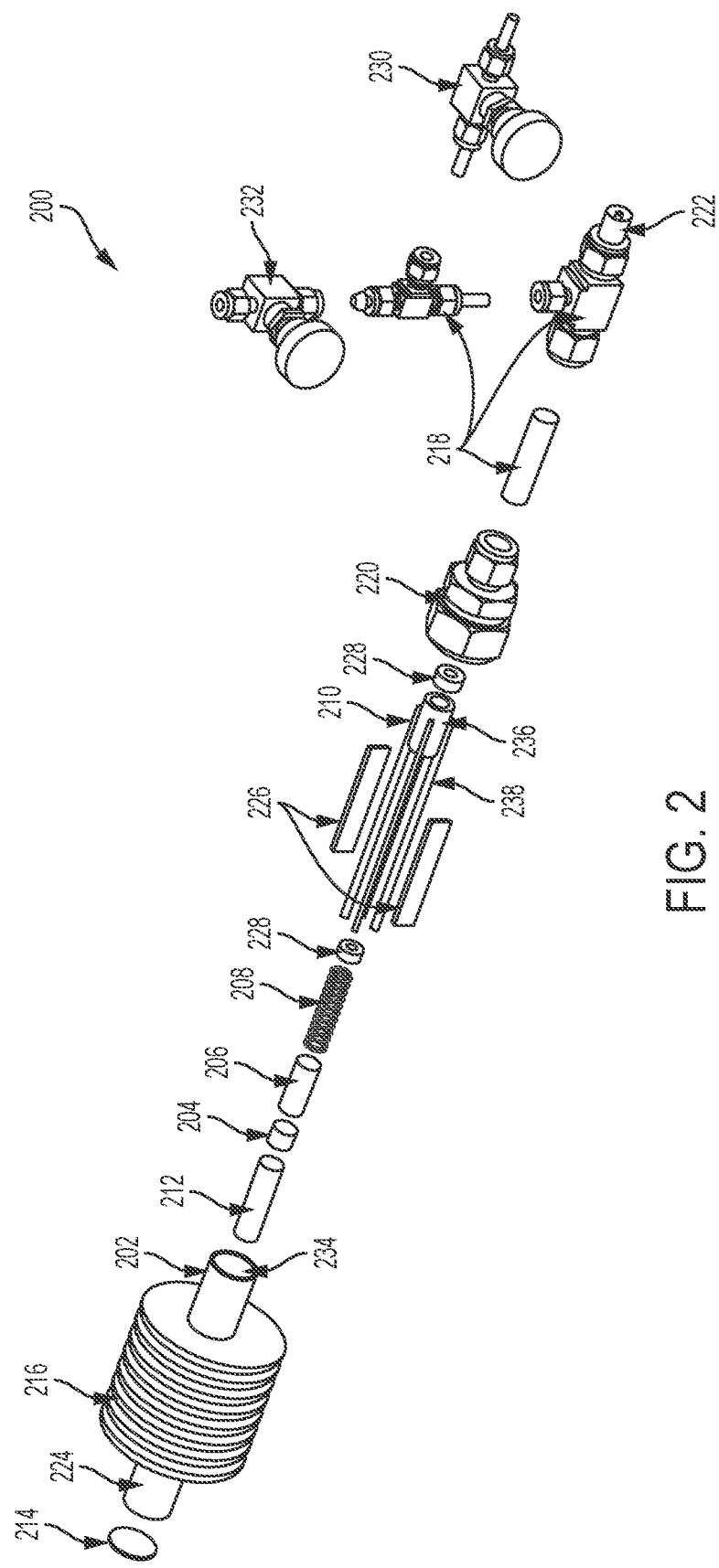
FIG. 2 illustrates an exploded view of a sensor component of the acoustic sensor device of FIG. 1 according to an example embodiment.

FIG. 2 illustrates an exploded view of a sensor component 200 of the acoustic sensor device 100 of FIG. 1 according to an example embodiment. In some example embodiments, the sensor component 200 corresponds to each of the acoustic transmitter 102 and the acoustic receiver 104 of FIG. 1. As illustrated in FIG. 2, the sensor component 200 may include a tube 202, a PZT crystal 204, and backing layer 206. The PZT crystal 204 and the backing layer 206 together form the PZT (shown as PZT 402 in FIG. 4) of the sensor component 200. In some example embodiments, the tube 202 may have approximately 1 inch outer diameter and approximately 0.083 inch wall thickness and may be made from stainless steel (e.g., SS316). The PZT crystal 204 may be an approximately ½ inch outer diameter crystal, and the backing layer may be a tungsten powder epoxy cylinder that is approximately 1 inch long and may also have a diameter of approximately ½ inch. In some alternative embodiments, the tube 202, the PZT crystal 204, and the backing layer 206 may have other dimensions (larger or smaller) without departing from the scope of this disclosure.

With respect to the acoustic transmitter 102, the tube 202 refers to a transmitter tube, the PZT crystal 204 refers to a transmitter PZT crystal 204, the backing layer 206 refers to a transmitter backing layer 206, the PZT refers to a transmitter PZT, the spring 208 refers to a transmitter spring, the cage structure 210 refers to a transmitter cage structure, the glass standoff 212 refers to a transmitter glass standoff, and the plate 214 refers to a transmitter plate. With respect to the acoustic receiver 104, the tube 202 refers to a receiver tube, the PZT crystal 204 refers to a receiver PZT crystal 204, the backing layer 206 refers to a receiver backing layer 206, the PZT refers to a receiver PZT, the spring 208 refers to a receiver spring, the cage structure 210 refers to a receiver cage structure, the glass standoff 212 refers to a receiver glass standoff, and the plate 214 refers to a receiver plate.

In some example embodiments, the sensor component 200 includes a spring 208, a cage structure 210, a glass standoff 212, and a plate 214. When assembled, the cage structure 210 is positioned in the interior space 234 of the tube 202, and the spring 208, the PZT crystal 204, the backing layer 206, and at least a portion of the glass standoff 212 may be surrounded by the cage structure 210. The cage structure 210 may serve to center the PZT crystal 204, the backing layer 206, the spring 208, and the glass standoff 212 within the interior space 234 of the tube 202.

In some example embodiments, the cage structure 210 may include a cylindrical portion 236 and baffles 238 that are attached (e.g., welded) to the cylindrical portion 236. The spring 208 is positioned between the backing layer 206 and the back of the cylindrical portion 236 of the cage structure 210. The cylindrical portion 236 may include an opening to allow, for example, electrical wiring to be routed through the opening. As shown in FIG. 2, the baffles 238 may be spaced from each other around the perimeter of the cylindrical portion 236. The cage structure 210 may be made from stainless steel (e.g., SS316) that can tolerate relatively high pressure and temperature that results from the fluid that flows through the pipe 108 shown in FIG. 1.

In some example embodiments, the sensor component 200 includes pads 226 (e.g., cork pads) and spacers 228 (e.g., cork spacers). With respect to the acoustic transmitter 102, the pads 226 refer to transmitter pads, and the spacers 228 refer to transmitter spacers. With respect to the acoustic receiver 104, the pads 226 refer to receiver pads, and the spacers 228 refer to receiver spacers. The pads 226 are positioned between the cage structure 210 and the inner wall of the tube 202. For example, the individual pads 226 may be positioned on opposite sides of the cage structure 210 between the cage structure 210 and the tube 202. The pads 226 may serve to dampen the transfer of vibration from the PZT crystal 204 to the tube 202. One of the spacers 228 is positioned within the cage structure 210 and the other one of the spacers 228 is positioned outside of the cage structure 210. For example, one spacer 228 may be positioned against the back of the cylindrical portion 236 within the cage structure 210 separating the spring 208 from the back of the cylindrical portion 236. The other spacer 228 may be positioned between the cage structure 210 and a fitting 220. The spacers 228 may serve to dampen the transfer of vibration from the PZT crystal 204 to the fitting 220.

In some example embodiments, the sensor component 200 includes valves 230, 232. For example, the valve 230 may correspond to the valve 132 of the acoustic transmitter 102 of FIG. 1 and to the valve 134 of the acoustic receiver 104 of FIG. 1. The valve 232 may correspond to the valve 128 of the acoustic transmitter 102 of FIG. 1 and to the valve 130 of the acoustic receiver 104 of FIG. 1. The valves 230, 232 may be used in the same manner as described with respect to the valves 132, 134 and the valves 128, 130, respectively. The fittings 218, 220 may be used for coupling different components of the sensor component 200 including the valves 230, 232. The fittings 218, 220 may be made from stainless steel material. For example, the fittings 218, 220 may be stainless steel SWAGELOK fittings.

In some example embodiments, the sensor component 200 includes a connector 222 that provides an electrical connection to the PZT crystal 204. For example, electrical wiring may be routed to the PZT crystal 204 from the connector (e.g., BNC) 222. The connector 222 enables electrical connection to an electrical signal source or an electrical signal receiver via an electrical cable. The fittings 218, 220 may include passageways to allow the wiring to be routed to the PZT crystal 204. The passageways of the fittings 218, 220 may also allow the heat transfer fluid described above with respect to FIG. 1 to occupy the sensor component 200 below the valve 232.

In some example embodiments, the connector 222 corresponds to the connector 110 of the acoustic transmitter 102 of FIG. 1 and to the connector 112 of the acoustic receiver 104 of FIG. 1. In some alternative embodiments, the connector 222 may be omitted without departing from the scope of this disclosure.

In some example embodiments, the glass standoff 212 is pressed against the plate 214 by a decompression force exerted on the backing layer 206 by the spring 208. For example, the spring 208 may be made from stainless steel (e.g., SS316). The decompression force exerted on the backing layer 206 results from the compression of the spring 208 when the fitting 220 is tightened as more clearly shown in FIG. 4.

In some example embodiments, the plate 214 is welded to the tube 202. For example, the plate 214 may be welded to the tube 202 at an end portion 224 of the tube 202. To illustrate, the plate 214 may enclose (i.e., fully close or seal) the opening of the tube 202 at the end portion 224 such that the heat transfer fluid (e.g., Therminol® 66) that is included in the sensor component 200 when the sensor component 200 is fully assembled does not escape through the opening of the tube 202 at the end portion 224. Further, because the plate 214 will be exposed to the fluid (e.g., steam) flowing through the pipe 108 shown in FIG. 1, the plate 214 also prevents the fluid in the pipe 108 from entering the tube 202 through the opening at the end portion 224. When the sensor component 200 is fully assembled, the glass standoff 212 presses against the plate 214 as the fitting 220 is tightened compressing the spring 208. In some example embodiments, the plate 214 may have a diameter that closely matches the outer diameter of the tube 202. For example, the plate 214 may have a diameter of approximately 1 inch and may have a nominal thickness of approximately 0.036 inch. In some example embodiments, the plate 214 may be made from stainless steel (e.g., SS316).

When the sensor component 200 is operating as a transmitting acoustic device (or acoustic transmitter) such as the acoustic transmitter 102 of FIG. 1, acoustic vibration generated by the PZT crystal 204 (e.g., in response to an electric signal provided to the PZT crystal 204) is transferred to the plate through the glass standoff 212. When the sensor component 200 is operating as a receiving acoustic device (or acoustic receiver) such as the acoustic receiver 104 of FIG. 1, vibration from the plate 214 is transferred to the PZT crystal 204 through the glass standoff 212. The glass standoff 212 provides low acoustic attenuation and good acoustic impedance matching between the PZT crystal 204 and the plate 214. In some example embodiments, the glass standoff 212 may have an approximately 0.5 inch diameter and approximately 1.75 inch length.

In some example embodiments, the sensor component 200 includes a heat sink 216. For example, the heat sink 216 may include multiple fins that are designed to dissipate heat away from the tube 202. For example, the heat sink 216 may be made from stainless steel or other suitable material as may be contemplated by those of ordinary skill in the art with the benefit of this disclosure. By dissipating heat away from the tube, the heat sink 216 may serve reduce the heat exposure of the PZT crystal 204 and other elements of the sensor component 200.

In some alternative embodiments, the glass standoff 212 may be another type of standoff instead of a glass standoff. For example, a standoff made from a material other than glass and that has low acoustic attenuation and adequate acoustic impedance matching characteristics may be used. Further, in some alternative embodiments, the pads 226 and/or the spacers 228 may be omitted without departing from the scope of this disclosure. In some alternative embodiments, one or more of the fittings 218, 220 may be omitted and/or combined. Further, although the spring 208 is shown as a spiral spring, another kind of spring with a desired temperature and pressure tolerance may be used. Dimensions described with respect to FIG. 2 are example dimensions and the components of the sensor component 200 may have other dimensions as may be contemplated by those of ordinary skill in the art with the benefit of this disclosure.

Figure 3:
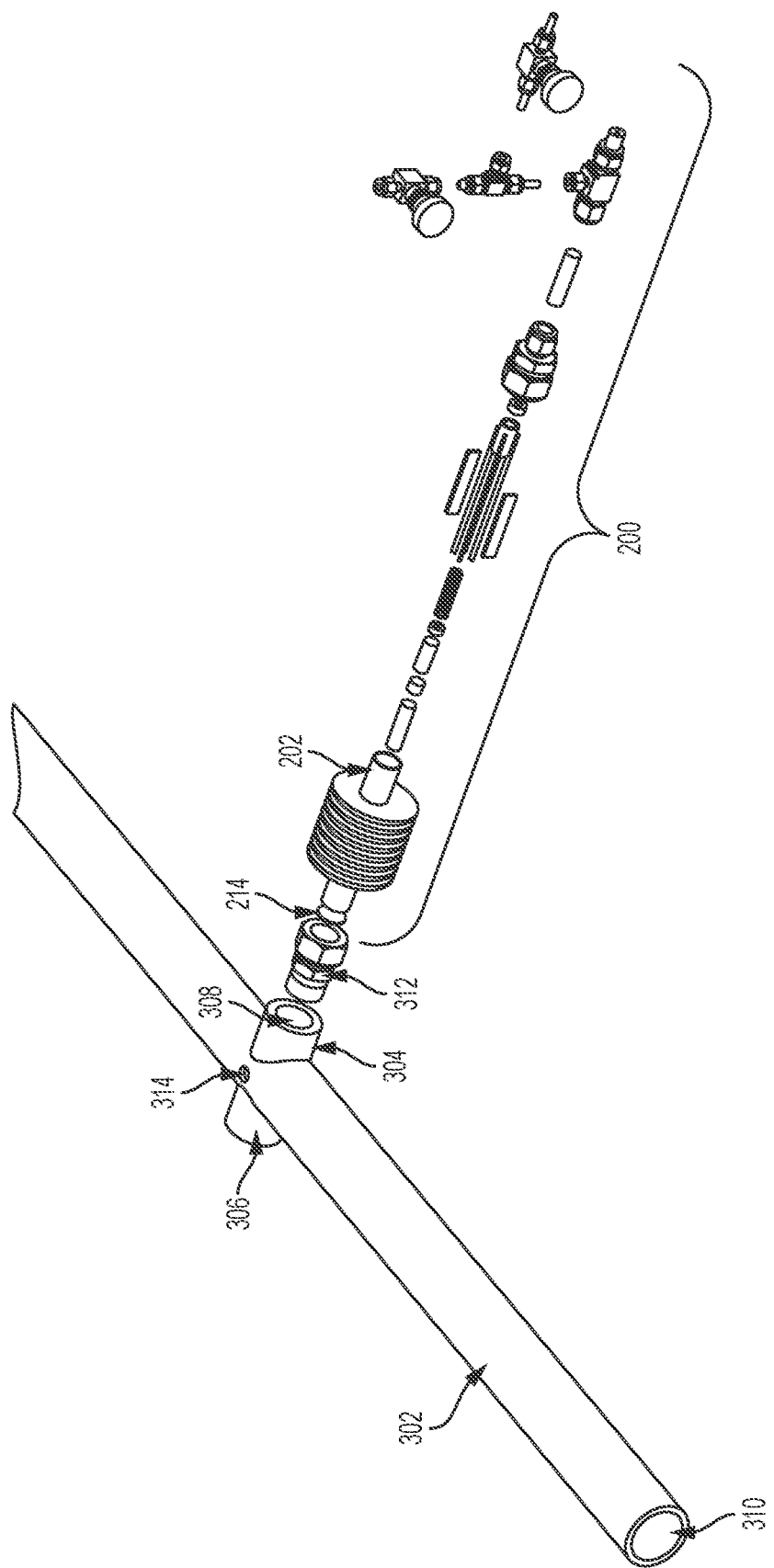
FIG. 3 illustrates an exploded view of a sensor component of FIG. 2 along with a pipe according to an example embodiment.

FIG. 3 illustrates an exploded view of the sensor component 200 of FIG. 2 along with a pipe 302 according to an example embodiment. As described above with respect to FIG. 2, the sensor component 200 corresponds to the acoustic transmitter 102 and the acoustic receiver 104 of FIG. 1. In some example embodiments, the pipe 302 corresponds to the pipe 108, and the fitting adapter 312 corresponds to the fitting adapters 124, 126 of FIG. 1.

As illustrated in FIG. 3, a branch connection 304 is attached (e.g., welded) to the pipe 302 on one side of the pipe 302, and a branch connection 306 is attached (e.g., welded) to the pipe 302 on an opposite side of the pipe 302. A hole 308 is formed in each branch connection 304, 306 providing passageways to the interior space 310 of the pipe 302 through the wall of the pipe 302. For example, each branch connection 304, 306 may be formed by welding a solid bar (e.g., a 2-inch solid bar) to the outside of the pipe 302. The hole 308 may then be then formed (e.g., drilled) through each branch connection 304, 306 and threaded to receive a male fitting adapter such as the fitting adapter 312. In some alternative embodiments, the branch connections 304, 306 may be formed using other means as may be contemplated by those of ordinary skill in the art with the benefit of this disclosure.

In some example embodiments, the sensor component 200 shown in FIG. 3 may be the acoustic transmitter 102 of FIG. 1 and may be connected to the branch connection 304 using the fitting adapter 312 as shown in FIG. 1. Another sensor component 200 may be connected to the branch connection 306 as the acoustic receiver 104 of FIG. 1 as shown in FIG. 1. In some example embodiments, the branch connections 304, 306 along with the respective hole 308 are positioned 180 degrees (as close to 180 degrees as practical) from each other to allow positioning of the plate 214 of a transmitting sensor component 200 (e.g., the acoustic transmitter 102 of FIG. 1) and a receiving sensor component 200 (e.g., the acoustic receiver 104 of FIG. 1) diametrically opposite from each other. The positioning of the branch connections 304, 306 diametrically opposite from each other allows for the plate 214 of the transmitting sensor component 200 and the plate 214 of the receiving sensor component 200 to be positioned diametrically opposite from each other, which enables optimal transfer of acoustic vibration from the transmitting sensor component 200 (e.g., acoustic transmitter 102 of FIG. 1) to the receiving sensor component 200 (e.g., acoustic receiver 104 of FIG. 1). In some example embodiments, the plate 214 of the transmitting sensor component 200 and the plate 214 of the receiving sensor component 200 when positioned in the respective fitting adapters 312 may be spaced from each other by approximately 4.85 inches.

In some example embodiments, the pipe 302 may have another hole 314 for attaching a pressure compensator such as the pressure compensator 106 of FIG. 1. For example, a fitting adapter having a passageway (e.g., a ¼ inch diameter passageway) through the fitting adapter may be attached (e.g., welded) to the pipe 302 at the hole 314 and a pipe/tubing of the pressure compensator may be connected (e.g. with a compression fitting) to the fitting adapter. For example, the pressure compensator 106 may be attached to the hole 314 via a fitting adapting as shown in FIG. 1. In some alternative embodiments, the hole 314 may be positioned at a location other than shown in FIG. 3 without departing from the scope of this disclosure.

Figure 4:
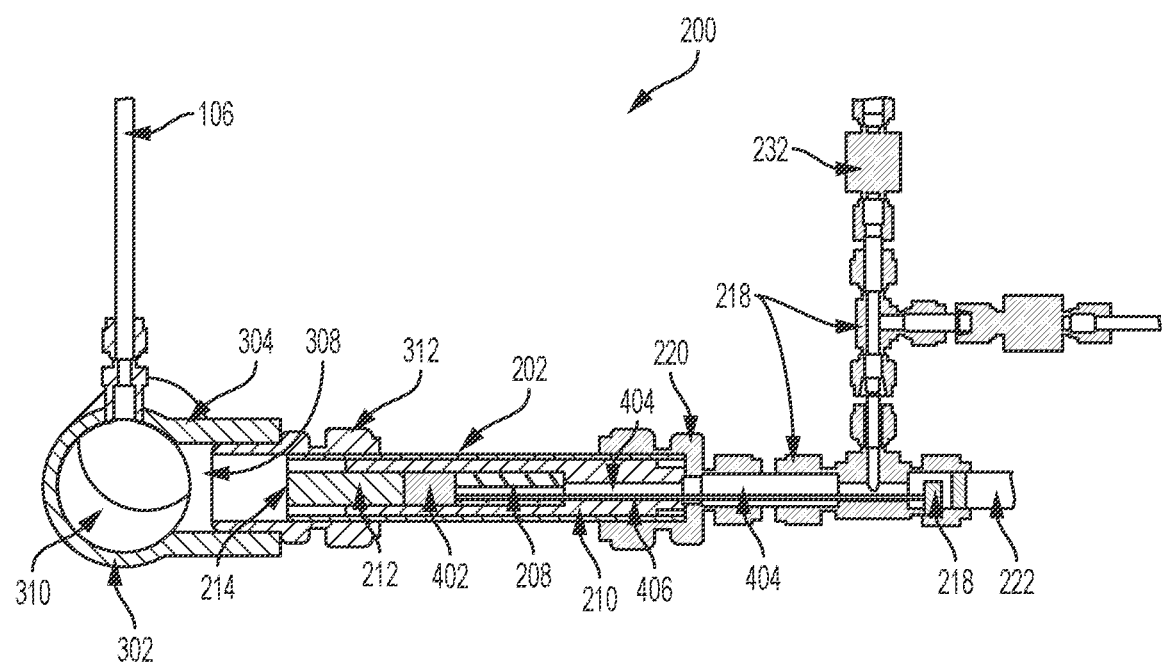
FIG. 4 illustrates a cross-sectional view of the sensor component and the pipe of FIG. 3 according to an example embodiment.

FIG. 4 illustrates a cross-sectional view of the sensor component 200 and the pipe 302 of FIG. 3 according to an example embodiment. The sensor component 200 is attached to the pipe 302 by the fitting adapter 312 that is mated with the branch connection 304. As illustrated in FIG. 4, the fitting adapter 312 is inserted into the hole 308 of the branch connection 304 extending into the interior space 310 of the pipe 302. The plate 214, which is attached (e.g., welded) to an end portion of the tube 202, is exposed to the interior space 310 of the pipe 302 through the hole 308 and a passageway of the adapter fitting 312 such that a fluid flowing through the pipe 302 may come in contact with the plate 214. For example, the plate 214 may enclose the opening of the tube 202 positioned in the fitting adapter 312.

As shown in FIG. 4, the glass standoff 212 presses against plate 214. To illustrate, the spring 208 exerts a force against a PZT 402, which is formed by the PZT crystal 204 and the backing layer 206 shown in FIG. 2. The PZT 402 presses against the glass standoff 212, which in turn presses against the plate 214. The spring 208 is compressed when the fitting 220 is tightened around the tube 202 moving the cage structure 210 in toward the plate 214. The fittings 218, 220 each have a passageway 404 that is occupied by a heat transfer fluid (e.g., Therminol® 66) and that allows wiring to be routed through the passageway 404. For example, the wiring 406 can be routed from the connector 222 to the PZT 402 through the passageways 404 to provide an electrical signal (e.g., a pulse) to the PZT 402.

In some example embodiments, the sensor component 200 is filled with a heat transfer fluid (e.g., Therminol® 66) between the plate 214 and the valve 232. The heat transfer fluid provides improved acoustic coupling between the PZT 402 and the glass standoff 212 and between the glass standoff 212 and the plate 214. The heat transfer fluid also prevents the fluid flowing through the pipe 302 from occupying the inside of the sensor component 200 when it is connected to the pressure compensator 106, and helps with heat dissipation, for example, from the PZT 402, which may prolong the life of the PZT 402.

In some example embodiments, the pressure compensator 106 is attached to the pipe 302 as shown in FIG. 4. The pressure compensator 106 serves to balance pressure against the opposite surfaces of the plate 214. To illustrate, the pressure compensator 106 helps balance the pressure exerted on the surface of the plate 214 facing the interior space 310 against the pressure exerted on the opposite surface of the plate 214, which helps maintain the integrity of the plate 214.

In some example embodiments, the sensor component 200 may be a transmitting sensor component 200 such as the acoustic transmitter 102 of FIG. 1. To illustrate, operating as the acoustic transmitter 102 of FIG. 1, the sensor component 200 may generate a high frequency pressure wave (i.e., acoustic wave/signal/vibration) that travels from the PZT 402 through the glass standoff 212 and excites a vibration in the plate 214 of the sensor component 200. For example, the PZT 402 may generate the high frequency pressure wave based on an electrical signal provided to the PZT via the connector 222 and the wiring 406. The vibration of the plate 214 of the (transmitting) sensor component 200 can generate an acoustic wave in the fluid flowing through the pipe 302 across the plate 214 of the sensor component 200. The acoustic wave generated in the fluid by the plate 214 of the (transmitting) sensor component 200 can excite vibration in the plate 214 of a (receiving) sensor component 200 (e.g., the acoustic receiver 104) that is attached to the pipe 302 opposite the (transmitting) sensor component 200.

Operating as the acoustic receiver 104, the sensor component 200 can generate an electrical signal based on the vibration of the plate of the (receiving) sensor component 200 and send out the electrical signal via the wiring 406 and the connector 222. To illustrate, the vibration in the plate 214 of the (receiving) sensor component 200 (i.e., the acoustic receiver 104) can travel from the plate 214, through the glass standoff 212, to the PZT 402, which generates a corresponding electrical signal.

By analyzing the electrical signal received from the (receiving) sensor component 200 (e.g., the acoustic receiver 104 of FIG. 1), acoustic characteristics (e.g., speed of sound, acoustic attenuation, etc.) of the fluid flowing through the pipe 302 may be determined. Based on known data related to acoustic and other characteristics of a fluid, the acoustic characteristics of the fluid flowing through the pipe 302 may be used to determine/estimate characteristics (e.g., vapor/steam quality, composition, etc.) of the fluid.

In some alternative embodiments, the plate 214 of the sensor component 200 may be closer to the interior space 310 of the pipe 302 than shown in FIG. 4.

Figure 5A:
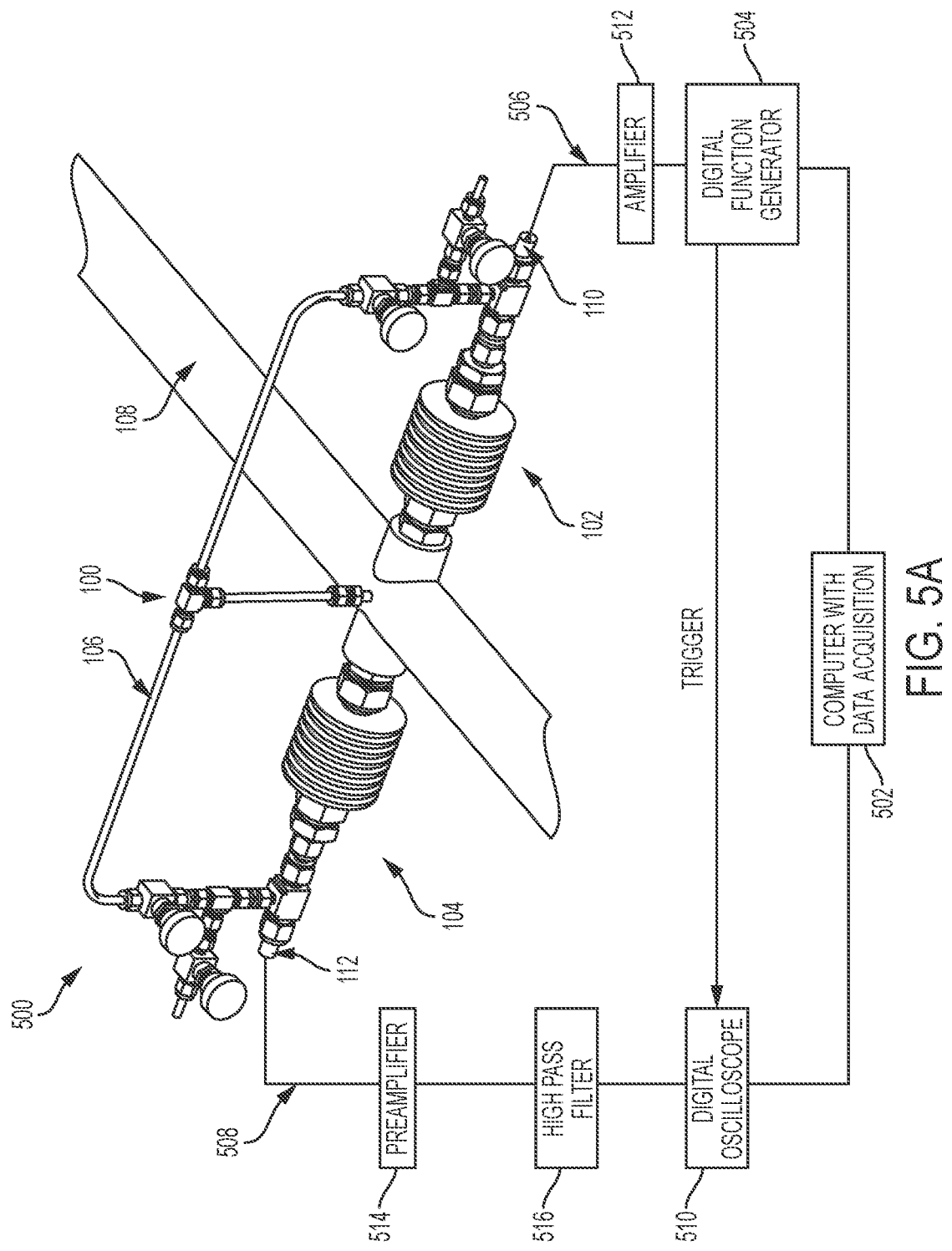
FIG. 5A illustrates an acoustic measurement system including the acoustic sensor device of FIG. 1 for measuring the acoustic properties of a multiphase fluid flowing through a pipe according to an example embodiment.
Figure 5B:
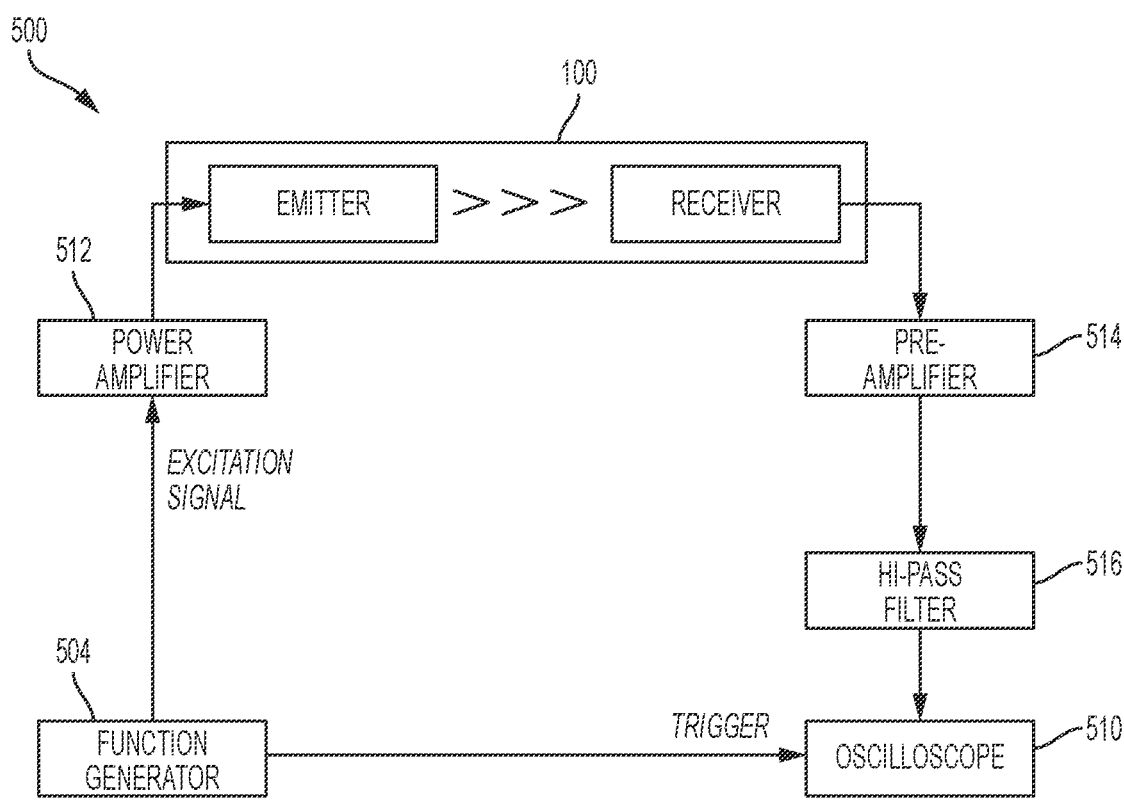
FIG. 5B is a block diagram representation of the system of FIG. 5A according to an example embodiment.

FIG. 5A illustrates an acoustic measurement system 500 including the acoustic sensor device 100 of FIG. 1 for measuring the acoustic properties of a multiphase fluid flowing through a pipe 108 according to an example embodiment. FIG. 5B is a block diagram representation of the system 500 of FIG. 5A without a computer according to an example embodiment. As shown in FIGS. 5A and 5B, the system includes the acoustic transmitter 102, the acoustic receiver 104, and the pressure compensator 106. In some example embodiments, the acoustic transmitter 102 and the acoustic receiver 104 are each the same as the sensor component 200 of FIGS. 2, 3, and 4 and operate in a corresponding manner described above. The pipe 108 may be the same as the pipe 302 shown in FIGS. 3 and 4.

In some example embodiments, the system 500 further includes an electrical signal source 504 (interchangeably referred to herein as a digital function generator) and an electrical signal receiver 510 (interchangeably referred to herein as a digital oscilloscope). The signal source 504, amplified by a power amplifier 512, is coupled to the connector 110 of the acoustic transmitter 102 via an electrical connection 506. The signal source/function generator 504 may provide a trigger signal to the signal receiver/oscilloscope 510 to enable time synchronization between the electrical signal generated by the signal source 504 and the electrical signal received by the signal receiver 510. The signal receiver 510 is coupled to a high pass filter 516 that is coupled to a preamplifier 514. The preamplifier 514 is coupled to the connector 112 of the acoustic receiver 104 via an electrical connection 508. The electrical signal from the acoustic receiver 104 may be amplified by the preamplifier 514 and filtered by the high pass filter 516 before being received by the electrical signal receiver 510. In some alternative embodiments, the preamplifier 514 and/or the high pass filter 516 may be omitted without departing from the scope of this disclosure.

The signal source 504 is designed to provide an electrical signal (e.g., a pulse) that can be used to implement the SFAI technique. For example, the frequency of the electrical signal provided by the signal source 504 may be varied with a range of frequency values to implement the SFAI technique. The SFAI technique is described in U.S. Pat. Nos. 5,767,407, 8,640,529 B2, and 8,820,147 B2 and incorporated herein by reference in their entirety. In some example embodiments, the frequency of the signal provided to the acoustic transmitter 102 by the signal source 504 may be around 750 KHz.

Referring to FIGS. 4 and 5, the electrical signal from the signal source 504 is provided to the PZT 402, which generates a vibration that is transferred to the plate 214 of the acoustic transmitter 102 through the glass standoff 212 of the acoustic transmitter 102. The vibration from the plate 214 of the acoustic transmitter 102 traverses the fluid flowing through the pipe 108 to the plate 214 of the acoustic receiver 104 that is preferably diametrically opposite the plate 214 of the acoustic transmitter 102. The vibration traversing the fluid may result in excitation of the plate 214 of the acoustic receiver 104, which transfers the vibration to the PZT 402 of the acoustic receiver 104 through the glass standoff 212 of the acoustic receiver 104. The PZT 402 of the acoustic receiver 104 may generate an electrical signal based on the vibration and provide the electrical signal to the signal receiver 510 via the connector 112 and the connection 508.

The use of the acoustic sensor device 100 described in this patent application involves the use of additional electronic and digital equipment as well as a computer or processor, in order to successfully exploit the SFAI technique for the characterization of multiphase fluids. Referring to FIGS. 5A and 5B, a computer 502 may be used with a twofold goal: (1) to generate the excitation signal used to drive the acoustic transmitter 102; (2) to post-process the signal transduced by the acoustic receiver 104 in order to extract information relevant to the characterization of multiphase fluids. With regard to goal (1), the computer or a processor 502 may execute a software code to generate an excitation signal and manage data communication with a digital function generator 504. As described in U.S. Pat. Nos. 5,767,407, 8,640,529 B2, and 8,820,147 B2, different approaches that can be used for the excitation signal's generation exist. The computer/processor 502 may also execute software code to perform other functions described herein with respect to the computer/processor 502.

The acoustic sensor devices discussed in this patent application have been successfully tested using an excitation signal consisting of a chirp modulated with a Tukey window and having a linear frequency sweep in the frequency band centered around 750 kHz. Other excitation signals like a chirp having a logarithmic sweep, a chirped Gaussian pulse and a tone burst at fixed frequency may be used. The signal output from the digital function generator 504 is supplied to a power amplifier 512 with controllable gain connected to the acoustic transmitter 102. With regard to goal (2), the computer 502 can execute a software code to manage data communication with a digital oscilloscope 510 and store the signal acquired through the digital oscilloscope 510 on the computer memory. More in detail, the digital oscilloscope 510 will acquire the signal output from a pre-amplifier 514 with controllable gain connected to the acoustic receiver 104.

In some example embodiments, the measurement process that includes receiving a chirp signal/tone burst emitted from the acoustic transmitter 102 after the chirp signal/tone burst passes through the multiphase fluid in the pipe 108 may be affected by a large amount of noise. The noise can be reduced if the digital function generator 504 and the digital oscilloscope 510 are set in order to perform signal averaging. Specifically, the function generator 504 can be set in order to repeatedly supply a chirp/tone burst to the acoustic emitter and trigger the digital oscilloscope's acquisition. Likewise, the digital oscilloscope 510 can be set in order to perform an averaging process on the waveforms repeatedly acquired from the acoustic receiver 104. The time $T_{avg}$ required to build an averaged measurement may be given by Equation 1:

$$T_{avg} = T_{trigger} \cdot N_{waveforms} \qquad \text{Equation 1}$$

where $T_{trigger}$ is the trigger interval time and $N_{waveforms}$ is the number of waveforms repeatedly acquired and averaged by the oscilloscope 510. Tests performed with steam at 380 psig flowing through the pipe 108 has shown the possibility to obtain acceptable signal-to-noise ratio by setting a trigger interval time as low as $T_{trigger}$=4 ms and a number of waveforms $N_{waveforms}$=4. This means that an averaged measurement can be built in 16 ms and for this reason the measurement process described above enables to perform measurements under fast changing conditions.

The data recorded and stored on the computer memory can be analyzed off-line. Also, it is worth noticing that the signals recorded with the oscilloscope 510 during preliminary testing have a duration of 125 k points with an 8-bit resolution. Because of the relatively low amount of data transmitted from the digital oscilloscope 510 to the computer 502, there are currently no technical limitations that could prevent achieving real-time post-processing of the acquired data. Details about the signal post-processing techniques that enable for the extraction of information from the recorded signals are discussed below.

In some example embodiments, the electrical signal received from the acoustic receiver 104 may be analyzed to determine acoustic characteristics (e.g., speed of sound and acoustic attenuation) of the flowing through the pipe 108. The acoustic characteristics of the fluid flowing through the pipe 302 determined based on the received electrical signal may be used to determine/estimate characteristics of the fluid. For example, when steam is flowing through the pipe 108, the acoustic characteristics may be used to determine the steam/vapor quality of the steam flowing through the pipe.

Post-processing techniques (i.e., processing of the data acquired by the computer 502) that enable for the extraction of acoustic characteristics from SFAI data are described in U.S. Pat. Nos. 5,767,407, 8,640,529 B2, and 8,820,147 B2. When measurements are performed on steam, it is possible to deduce steam quality from speed of sound measurements on the basis of equations describing homogeneous equilibrium flow, for example, as described in G. B. Wallis, "One-dimensional two-phase flow", New York, McGraw-Hill, 1969, which is incorporated herein by reference.

Figure 6:
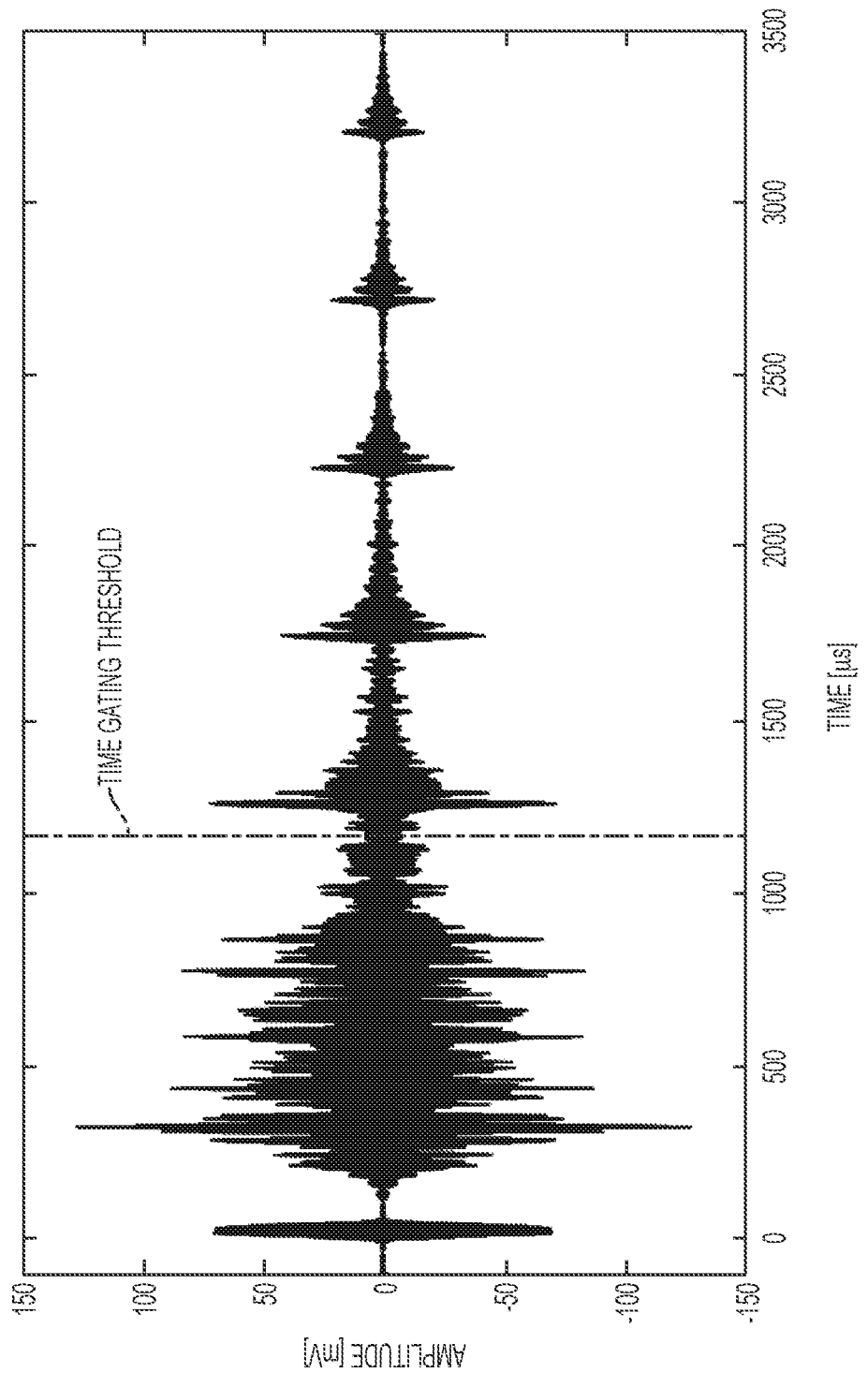
FIG. 6 illustrates data obtained using steam with the system of FIG. 5A according to an example embodiment.

A post-processing technique successfully implemented to extract speed of sound estimations from preliminary data acquired with the devices presented in this patent application may include the following steps:

1. the averaged measurements collected with the digital oscilloscope 510 are filtered in the same band of frequency used for the generation of a chirp modulated with a Tukey window and having a linear frequency sweep (e.g., FIG. 6 shows the preliminary data that have been post-processed using a $3^{rd}$ order Butterworth filter on the band centered around 750 kHz);
2. the filtered signal is time gated in order to remove from the measured response the effects of the acoustic coupling between the acoustic transmitter 102 and the acoustic receiver 104 through the device's tubes swaged into the pipe spool (see time gating threshold shown in FIG. 6);
3. the autocorrelation function (see FIG. 7) is computed on the filtered and time gated signals. Computation of the autocorrelation function is described in J. S. Bendat and A. G. Piersol, Random data: analysis and measurement procedures, Fourth Edition ed., Hoboken, N.J: Wiley, 2010, which is incorporated herein by reference. The first highest peak in the autocorrelation response obtained for positive time lags (see cross mark in FIG. 7) is used to determine the round-trip time required by the acoustic wave to cover the distance between the acoustic transmitter 102 and the acoustic receiver 104.

The procedure described above enables the computation of the speed of sound c expressed in [m/s] as given in Equation 2:

$$c = 2L/\tau_1 \qquad \text{Equation 2}$$

where L is the gap between the acoustic transmitter and the acoustic receiver expressed in [m] and $\tau_1$ is the time lag associated to the first highest peak in the autocorrelation response expressed in [s].

Figure 7:
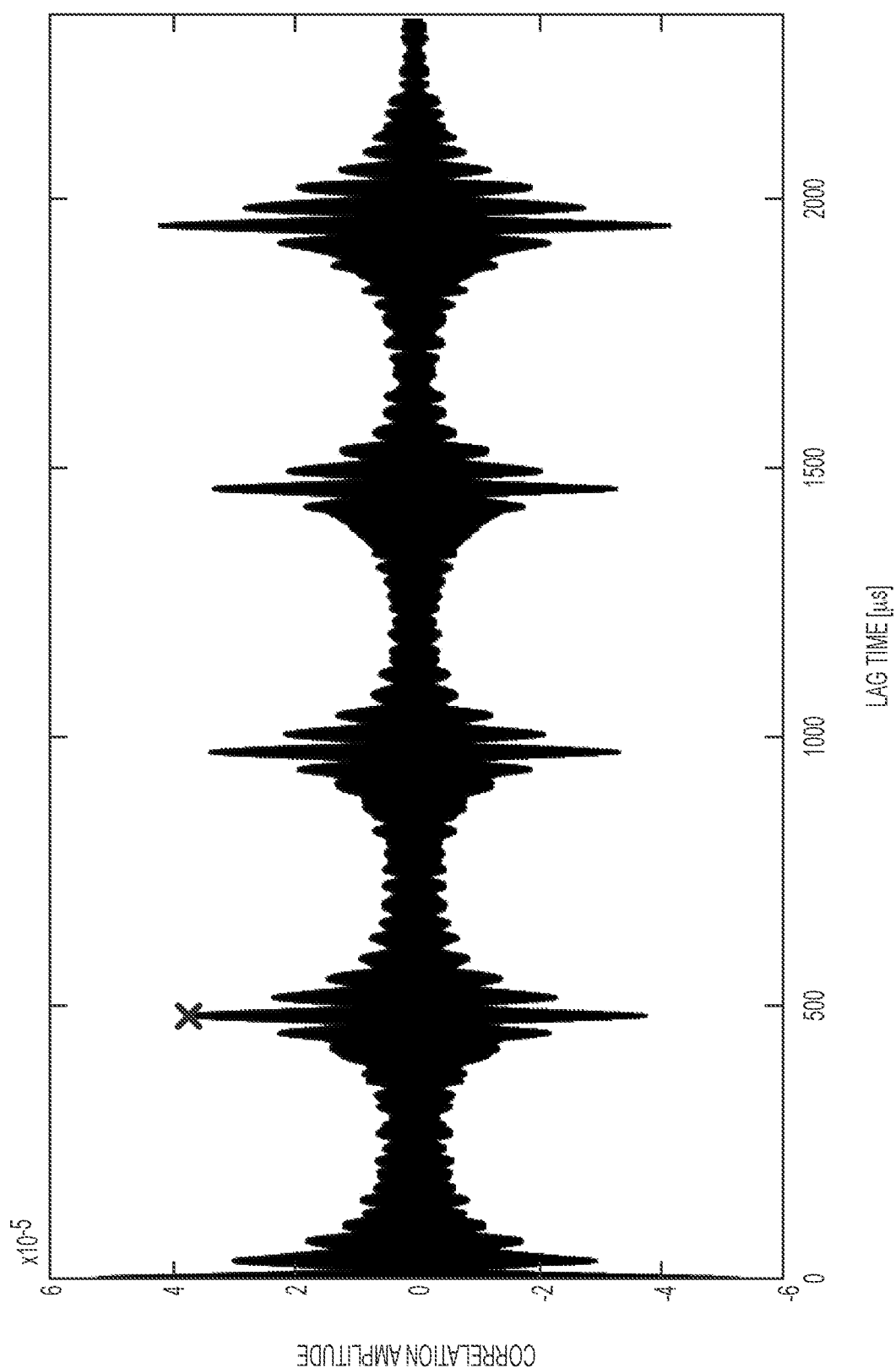
FIG. 7 illustrates the autocorrelation function of data of FIG. 6 according to an example embodiment.

The data of FIG. 6 and the autocorrelation function of FIG. 7 have been obtained by testing steam at 100% quality (i.e., pure vapor) flowing in a pipe (e.g., component 108) at a flow rate of 40 barrels per day (BPD) and at a pressure of 376 psig. The offset (i.e., separation) between the acoustic transmitter 102 and the acoustic receiver 104 is L=4.838″. The time lag associated to the first highest peak in the autocorrelation response is $\tau_1$=487.2 µs. According to Eq. 2, the speed of sound is estimated to be c=504.5 m/s. The estimated value compares favorably with the theoretical one equal to 504.4 m/s that is predicted with homogenous flow equations (See G. B. Wallis, "One-dimensional two-phase flow", New York, McGraw-Hill, 1969, and W. Wolfgang, H. J. Kretzschmar, "International Steam Tables, Algorithms, Diagrams, and CD-Rom Electronic Steam Tables", Dordrecht: Springer, 2008).

In some alternative embodiments, a post-processing technique to extract the speed of sound estimations from data acquired with the embodiments of the acoustic sensor devices presented in this patent application may include the following steps:

1. the excitation signal is a chirp modulated with a Tukey window and having a linear frequency sweep in the frequency band 300 kHz-1 MHz;
2. the received signal is filtered with a third order Butterworth filter in the frequency band 300 kHz-1 MHz;
3. the unbiased cross-correlation response (as readily understood by those of ordinary skill in the art with the benefit of this disclosure and which is also described in J. S. Bendat and A. G. Piersol, Random data: analysis and measurement procedures, Fourth Edition ed., Hoboken, N.J: Wiley, 2010) is computed between the input (i.e., chirp signal) and the output (i.e., measured response signal); and
4. the chirp's round-trip travel time i between the plates of the acoustic transmitter and the acoustic receiver is measured as the time difference between the second peak and the first peak, or any consecutive two peaks, in the cross-correlation response.

The procedure described above enables the computation of the speed of sound c expressed in [m/s] as given in Equation 3:

$$c = 2L/\tau \qquad \text{Equation 3}$$

where L is the offset between the plates of the acoustic transmitter and the acoustic receiver expressed in meters and i is the round-trip travel time expressed in seconds. The measurement results obtained using the above steps compare favorably with theoretical values.

In general, all the components of the system 100 can operate at temperatures above 85 degree Celsius. With reference to the system 500, the electrical connections 506 and 508 can be arranged in order to keep all the electrical and electronic components of the system 500 away from heat sources. For example, the electrical connections 506, 508 (e.g., electrical cables) can each be long enough to keep the electrical and electronic components of the system 500 at safe distance from heat sources that may be present in oil/gas and other operations that involve the transfer of steam from/to oil reservoirs and other elements.

In general, the electrical signal (i.e., excitation signal) sent to the PZT of the acoustic transmitter 102 is generated with a digital function generator 504 and amplified by a power amplifier 512 that has a controllable gain. The electrical signal transduced by the PZT of the acoustic receiver 104 is received and amplified by a preamplifier 514, which has a controllable gain, and acquired with a digital oscilloscope 510. The electrical signal sent to the digital function generator 504 may be defined using a software that enables for the creation of excitation signals suitable for the application of the Swept-Frequency Acoustic Interferometry SFAI technique (i.e., chirp signal/tone burst). The software also may enable the user to set the parameters of the digital function generator 504 (e.g., trigger interval) and of the digital oscilloscope 510 (e.g., number of waveforms used to perform signal averaging).

In some example embodiments, the software may be run on a computer 502 with the capability to manage the data communication with the digital function generator 504 and the digital oscilloscope 510. Additionally, the software may implement signal post-processing techniques enabling for the extraction of information that may be used to characterize multiphase fluid. A signal processing technique that is based on the analysis of the autocorrelation function computed on the data acquired from the acoustic receiver may be used to perform estimation of the speed of sound of the fluid flowing through the pipe 108. Alternatively, a signal processing technique that is based on the analysis of the cross-correlation function computed on the data acquired from the acoustic receiver may be used to perform estimation of the speed of sound of the fluid flowing through the pipe 108. The speed of sound estimation may be subsequently used to characterize a multiphase fluid (e.g., equations describing homogeneous equilibrium flow may be used to deduce steam quality from speed of sound measurements).

Although the pipe 302 is cylindrical as shown in FIGS. 3 and 4, in alternative embodiments, the pipe 302 may have other shapes. Although the electrical signal source 504 and the electrical signal receiver 510 are shown in FIG. 5 as separate components, in some example embodiments, the electrical signal source 504 and the electrical signal receiver 510 may be combined into single equipment.

Figure 8:
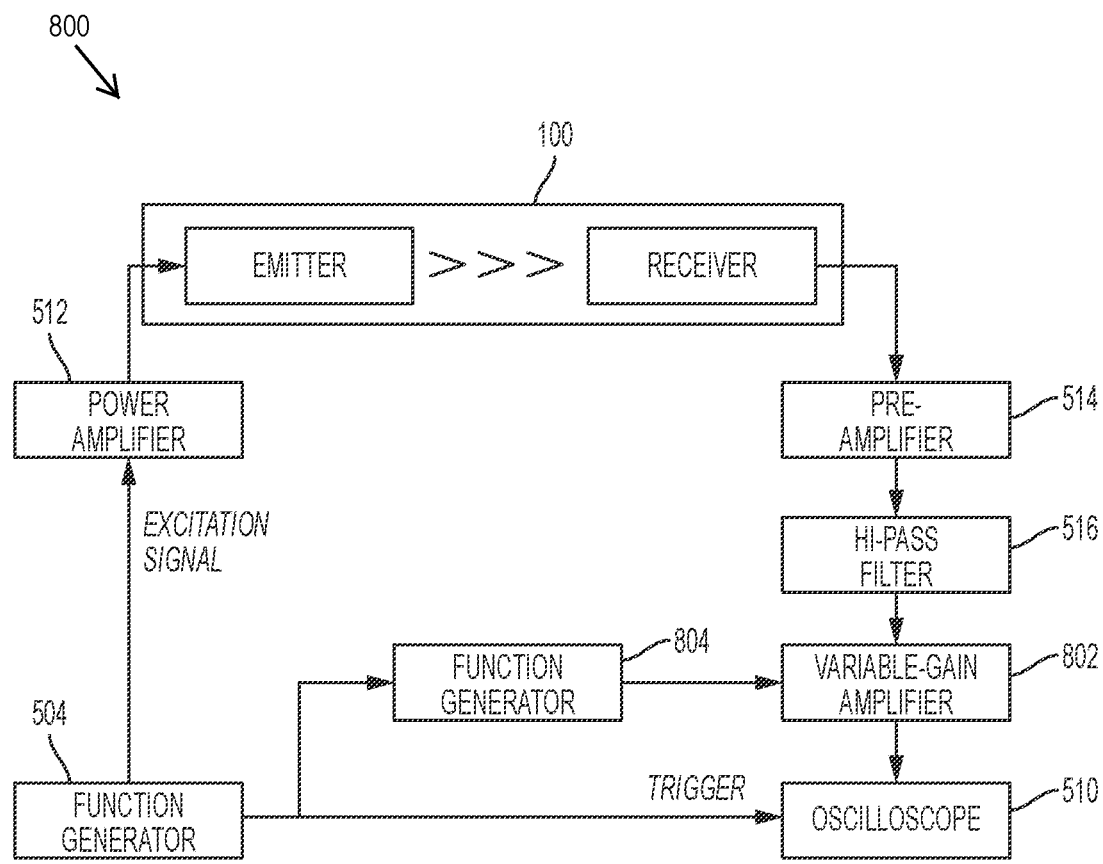
FIG. 8 illustrates a block diagram of an acoustic measurement system including the acoustic sensor device of FIG. 1 for measuring the acoustic properties of a multiphase fluid flowing through a pipe according to another example embodiment.

FIG. 8 illustrates a block diagram of an acoustic measurement system 800 including the acoustic sensor device 100 of FIG. 1 for measuring the acoustic properties of a multiphase fluid flowing through the pipe 108 according to another example embodiment. In some example embodiments, the system 800 includes the components of the system 500 of FIGS. 5A and 5B and may generally be operated to measure the acoustic properties of a multiphase fluid (e.g., steam quality measurement) in a similar manner as described with respect to FIGS. 5A and 5B. For example, the system 800 includes acoustic sensor device 100 that includes the acoustic transmitter 102, the acoustic receiver 104, and the pressure compensator 106 attached to the pipe 108. The system 800 also includes the electrical signal source 504 and the electrical signal receiver 510. The signal source 504, amplified by the power amplifier 512, is provided to the acoustic transmitter 102.

In some example embodiments, the system 800 may also include the preamplifier 514, the high pass filter 516, and a variable-gain amplifier 802. The signal receiver 510 may be coupled to the variable-gain amplifier 802, which is coupled to the high pass filter 516. The high pass filter 516 may be coupled to the preamplifier 514 that is coupled to the acoustic receiver 104 and receives an electrical signal from the acoustic receiver 104. The electrical signal from the acoustic receiver 104 may be amplified by the preamplifier 514, filtered by the high pass filter 516, and then amplified by the variable-gain amplifier 802 before being received by the signal receiver 510.

In some example embodiments, the signal source/function generator 504 may also provide a trigger signal to the signal receiver/oscilloscope 510 to enable time synchronization between the electrical signal generated by the signal source 504 and the electrical signal received by the signal receiver 510. In some example embodiments, the system 800 may also include a second signal source/function generator 804 that can provide a control signal to the variable-gain amplifier 802 to control the operation of the variable-gain amplifier 802 as can be readily understood by those of ordinary skill in the art with the benefit of this disclosure. The variable-gain amplifier 802 can vary its gain based on the signal provided by the second signal source/function generator 804. The control signal provided to the variable-gain amplifier 802 may be generated by the second signal source/function generator 804. Time synchronization between the control signal provided to the variable-gain amplifier 802, the electrical signal generated by the signal source 504 and the electrical signal received by the signal receiver/oscilloscope 510 may be achieved through the trigger signal provided by the signal source 504.

In some alternative embodiments, the preamplifier 514, the high pass filter 516, and/or the variable-gain amplifier 802 may be omitted without departing from the scope of this disclosure. In some alternative embodiments, one or more components of the system 800 may be integrated into a single component without departing from the scope of this disclosure. In some example embodiments, the system 800 may include other components than shown in FIG. 8 without departing from the scope of this disclosure.

Figure 9:
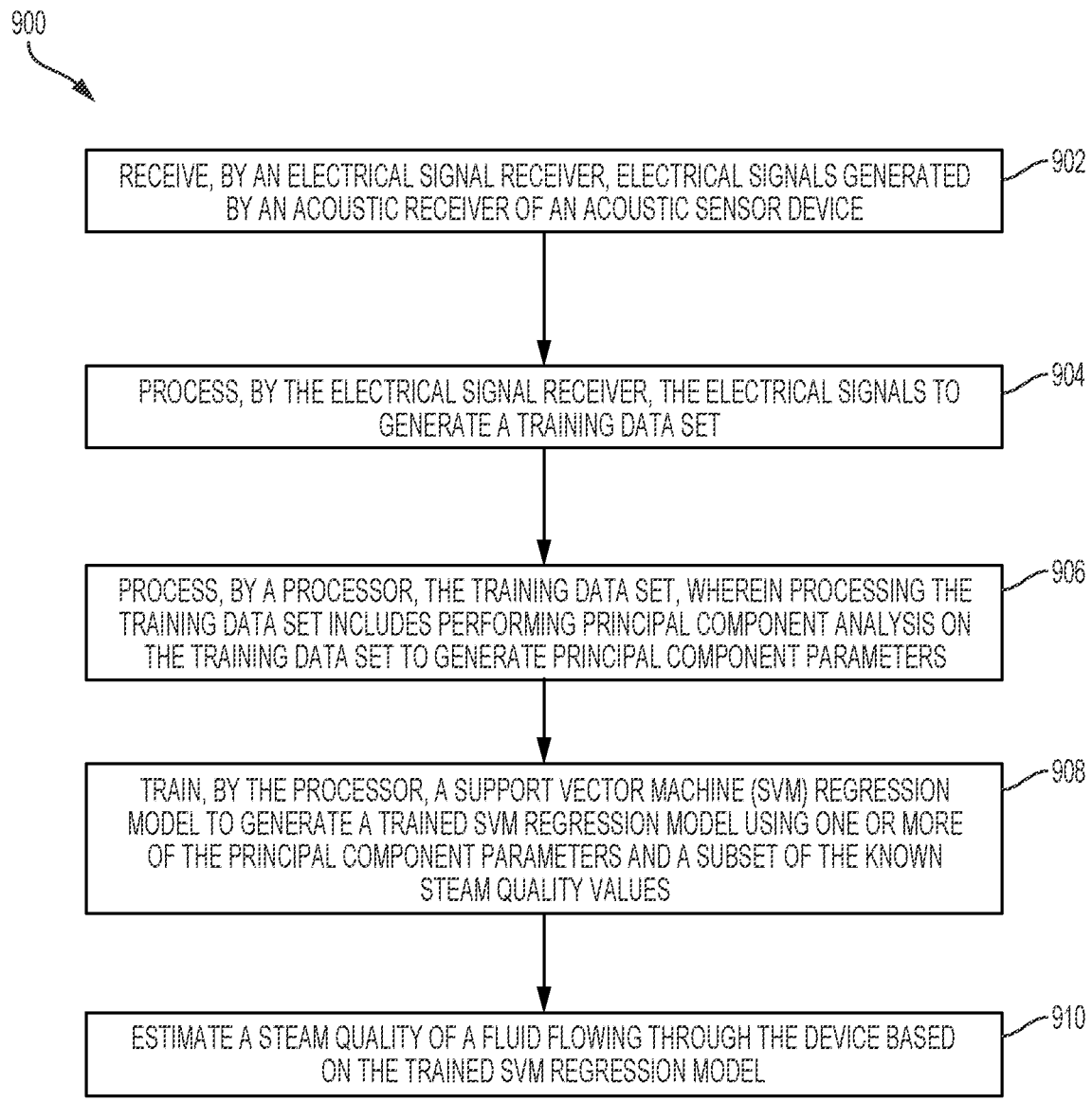
FIG. 9 illustrates a method for steam quality measurement using the acoustic sensor device of FIG. 1 and a trained regression model generated using machine learning techniques according to an example embodiment.

FIG. 9 illustrates a method 900 for steam quality measurement using the acoustic sensor device 100 of FIG. 1 and a trained regression model generated using machine learning techniques according to an example embodiment. In some example embodiments, the acoustic measurement system 500 or the acoustic measurement system 800 may be used to perform the method 900. For example, the computer/processor 502 may execute software code to perform some the operations described herein. Further, although not shown in FIG. 8, the system 800 may also include computer/processor 502 to execute software code to perform some the operations described herein.

In some example embodiments, at step 902, the method 900 may include receiving electrical signals generated by the acoustic receiver 104, where the electrical signals are generated based on acoustic waves traversing fluids that have known steam quality values. For example, the electrical signals generated by the acoustic receiver 104 may be received by the electrical signal receiver/oscilloscope 510 after being amplified by the preamplifier 514 and filtered by the high pass filter 516. Further, the filtered electrical signals may also be amplified by the variable-gain amplifier 802. Alternatively, one or more of these operations may be omitted without departing from the scope of this disclosure.

As described above, the acoustic waves are generated by the acoustic transmitter 102. To illustrate, the electrical signals may be generated for different operating points (e.g., 29 operating points), where an operating point is defined by the steam quality and the flow rate of the fluid flowing through the pipe 108 (or the pipe 302). For example, some of the operating points can correspond to single-phase flow conditions at 0% steam quality (i.e., liquid water and no vapor) with a total flow rate of 100, 150, 200, 250 and 300 barrels per day (bpd) and at 100% steam quality (i.e., vapor and no liquid water) with a vapor flow rate of 10, 20, 30, 40, 50, 60, 70 and 80 bpd. Some of the other operating points may correspond to intermediate steam qualities (e.g., 30%, 40%, 60% and 80%), each with a vapor flow rate of 50, 60, 70 and 80 bpd. In some alternative embodiments, the operating points can correspond to different steam quality and flow rates without departing from the scope of this disclosure.

In some example embodiments, for each of the operating points, multiple measurements (e.g., 50), where the electrical signal from the acoustic receiver 104 is received, may be made. To illustrate, 29 operating points where the electrical signal from the acoustic receiver 104 is received (i.e., measured) may result in a training data set that has a total of 1450 measurements.

In some example embodiments, additional measurements may also be made to form a test data set that can be used to verify the capability of the trained regression model. Additional measurements may also be made at other operating points to assess the amount of efforts that may be needed to fully train the regression model.

In some example embodiments, the system 800 may be operated to perform the measurements where the electrical signals corresponding to different measurements are received from the acoustic receiver 104. For example, the signal source/function generator 504 may output an excitation signal that is a burst of 50 linear sweep Tukey envelope chirps with a length of 1 microsecond over the frequency interval 300 kHz-1 MHz, parameter a set to 0.4 and amplitude of 1.8 V. The gain of the power amplifier 512 (e.g., a Krohn-Hite power amplifier) may be set to a 0-14 dB range with the built-in voltage meter reading a voltage output in between 7.0-7.1 V. The gain of the preamplifier 514 may be set to 60 dB. The time base of the electrical signal receiver/oscilloscope 510 may be set to 0.001 s, with a horizontal delay of 0.0046 s and a record length of 125 k points. Acquisition by the electrical signal receiver/oscilloscope 510 can be triggered by the signal source/function generator 504 every 80 ms and multiple waveforms (e.g., 64 waveforms) may be averaged by the electrical signal receiver/oscilloscope 510. Based on these settings, the time required to collect a single measurement may be approximately 5.120 seconds. The signal source/function generator 804 can be set to generate a ramp with the following parameters: high impedance and inverted output, symmetry 0.0%, Hi Level +500 mV, Lo Level +0 mV, period 9.6 ms, burst mode with external trigger set to positive rising edge and start phase 0.00. In some alternative embodiments, some or all of the above parameters may have a different value/setting.

At step 904, the method 900 may include processing the electrical signals to generate a training data set. For example, the processing of the electrical signals may include cutting the time histories of the electrical signals received by the electrical signal receiver/oscilloscope 510 to a particular time interval (e.g., 100 microseconds-2500 microseconds). The processing of the electrical signals may further include filtering the electrical signals with the cut time histories with a 3rd order Butterworth filter in the frequency interval 300 kHz-1 MHz. The processing of the electrical signals may also include computing the envelope of each trimmed and filtered signal (i.e., perform absolute value of the Hilbert transform). The envelope of each time history preserves the signal's amplitude and discards signal's phase. Further, the envelopes may also be zero-meaned and normalized to have a unitary root mean square (RMS) value. The envelopes of all the measurements (i.e., the electrical signals received from the acoustic receiver 104 and processed as described above) representing the training data set may be stored column-wise in a matrix M. For example, the size of the matrix M may be 29999×1450, where 29999 is the number of points of each envelope and 1450 is the size of the training set. In some alternative embodiments, the matrix M may have different dimensions. In some alternative embodiments, the envelopes may also be stored in a different format.

At step 906, the method 900 may include processing the training data set generated at step 904, where processing the training data set includes performing principal component analysis (PCA) on the training data set to generate principal component parameters. For example, the principal component analysis of the training data set may be performed using the MATLAB built-in function, PCA. Specifically the coefficients C, scores S and the principal component variance V may be retrieved as [C,S,V]=PCA(M', 'Centered', false), where the flag 'Centered' being set to 'false' allows reconstruction of M' as M'=S*C', where * denotes the matrix product and "'" is the transpose operator. The size of S and C may respectively equal 1450×1450 and 29999×1450 based on example values provided above. The total number of principal components is equal to 1450 based on the example values provided above. In some alternative embodiments, PCA functions other than MATLAB PCA function may be used to perform principal component analysis on the training data set.

At step 908, the method 900 may include training a support vector machine (SVM) regression model to generate a trained SVM regression model using one or more of the principal component parameters and a subset of the known steam quality values. For example, the SVM regression model may be trained using steam quality as the response variable and the scores S associated to the first X number (e.g., 75) of the principal components as predictor variables. Limiting the number of principal components to the first X number may be done based on a compromise between the quality of the results obtained (i.e., low error in steam quality estimation) and the complexity of the SVM regression model. In MATLAB, the FITRSVM function may be called with the following settings ['KernelFunction', 'polynomial', 'KernelScale', 'auto', 'BoxConstraint', 1000, 'Epsilon', 0.1, 'Standardize', true] to generate the trained SVM regression model.

In some example embodiments, the capability of the trained SVM regression model may be tested using test data generated based on fluids having known steam quality values. After the principal component coefficients C have been computed and the trained SVM regression model has been generated, the capability of the SVM model to estimate the steam quality of a fluid flowing through the pipe 108 (or the pipe 302) may be tested using a test data set generated in a similar manner as the training data set. To illustrate, the time history trimming, filtering and envelope computation are performed based on electrical signals received from the acoustic receiver 104 in a similar manner as described above, the envelopes associated with the test data set from acoustic sensor device 100 may be projected into the PCA space and the associated scores Se may be obtained as Se=C' *e, where e represents a given envelope. The first X (e.g., 75) elements of the vector Se (i.e., scores associated to the first X principal components used to represent the envelope e) may be passed to the trained SVM regression model generated at step 908, and the steam quality prediction q may be retrieved using the built-in MATLAB prediction function, predict.

In general, an SVM regression model may be trained to generate a trained SVM regression model by performing Principal Component Analysis (PCA) on a training data set to create a new space where a small subset of principal components account for most of the variability in the data collected based on the electrical signals from the acoustic receiver 104. The training data set represented in the PCA space is used to fit an SVM regression model that, once trained, allows the trained SVM regression model to provide a predictive steam quality discriminator for analyzing unknown flow conditions. New measurements performed using the acoustic sensor device 100 may be projected into the PCA space and passed to the trained SVM regression model for steam quality estimations/predictions.

At step 910, the method 900 may include estimating a steam quality of a fluid flowing through the device 100 using the trained SVM regression model, where the flow conditions may be unknown. New measurements performed using the acoustic sensor device 100 may be projected into the PCA space as described above and passed to the trained SVM regression model for steam quality estimations/predictions.

In some example embodiments, functions other than MATLAB functions may be used to generate a trained regression model. In some example embodiments, the method 900 may include more steps than described above without departing from the scope of this disclosure. In some example embodiments, one or more of the steps of the method 900 may be performed in a different order than described above without departing from the scope of this disclosure. As described above, machine learning may be leveraged to create a regression model that ultimately enables estimation of the steam quality from ultrasound measurements collected with the transducers of the acoustic sensor device 100 that are in the pitch-catch configuration. In some alternative embodiments, the method 900 may be performed with an acoustic sensor device other than the acoustic sensor device 100 without departing from the scope of this disclosure.

Figure 10:
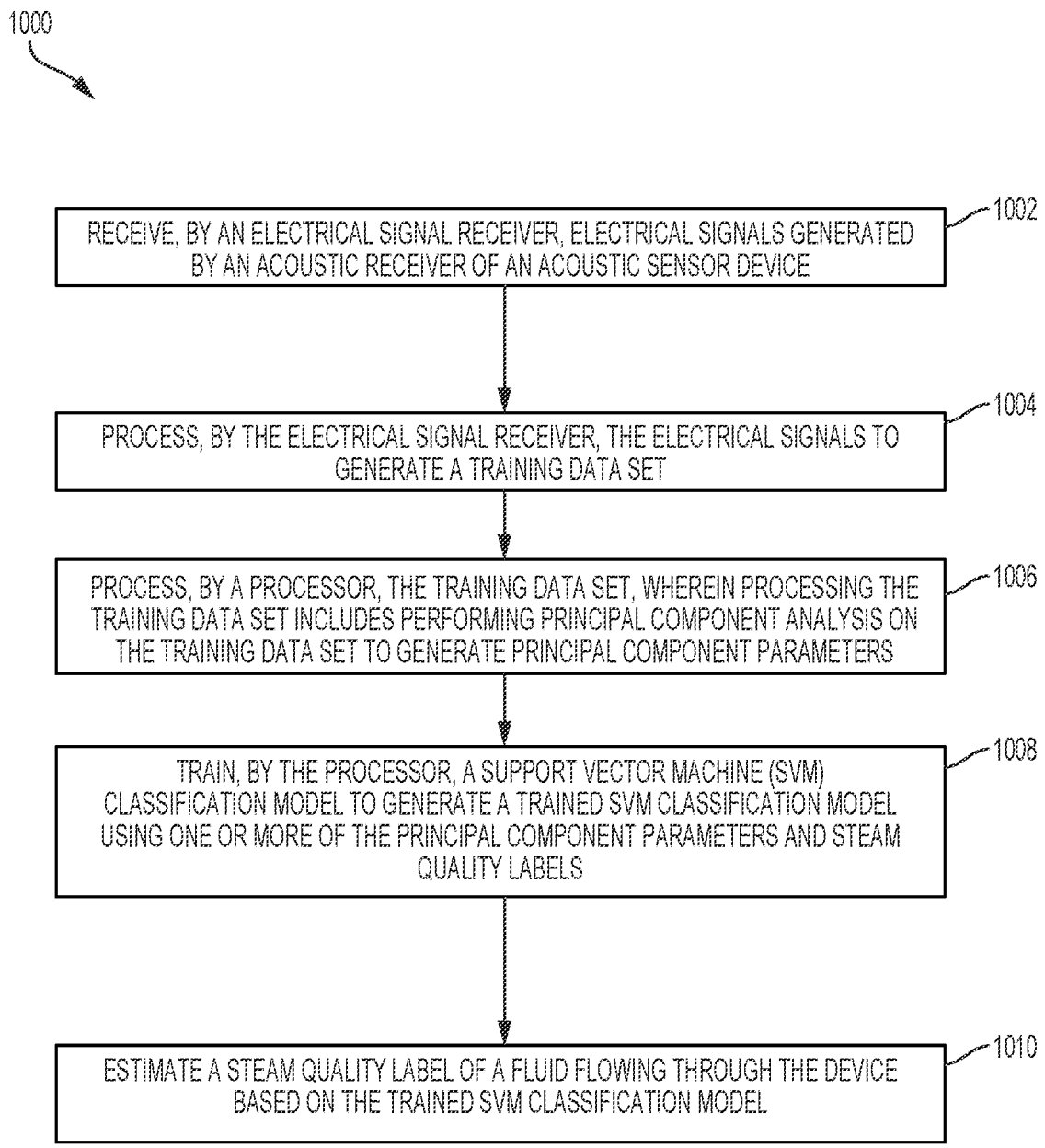
FIG. 10 illustrates a method for steam quality measurement using the acoustic sensor device of FIG. 1 and a trained classification model generated using machine learning techniques according to an example embodiment.

FIG. 10 illustrates a method 1000 for steam quality measurement using the acoustic sensor device 100 of FIG. 1 and a trained classification model generated using machine learning techniques according to an example embodiment. In some example embodiments, the acoustic measurement system 500 or the acoustic measurement system 800 may be used to perform the method 1000. For example, the computer/processor 502 may execute software code to perform some the operations described herein. Further, although not shown in FIG. 8, the system 800 may also include computer/processor 502 to execute software code to perform some the operations described herein.

In some example embodiments, at step 1002, the method 1000 may include receiving electrical signals generated by the acoustic receiver 104, where the electrical signals are generated based on acoustic waves traversing fluids that have known steam quality values. In some example embodiments, step 1002 may be substantially the same as step 902 of the method 900.

At step 1004, the method 1000 may include processing the electrical signals to generate a training data set. For example, step 1004 may be substantially the same as step 904 of the method 900. At step 1006, the method 1000 may include processing the training data set generated at step 1004, where processing the training data set includes performing principal component analysis (PCA) on the training data set to generate principal component parameters. For example, step 1006 may be substantially the same as step 906 of the method 900.

At step 1008, the method 1000 may include training a support vector machine (SVM) classification model to generate a trained SVM classification model using one or more of the principal component parameters and steam quality labels. For example, the SVM classification model may be trained using steam quality label as the response variable and the scores S associated to the first X number (e.g., 75) of the principal components as predictor variables.

In some example embodiments, the method 1000 may include generating steam quality labels based on steam quality values before performing step 1008 to train the SVM classification model. For example, a first range of steam quality values (e.g., 0% to 40%) may be labeled as a low quality steam (or another label), a second range of steam quality values (e.g., >41% and <70%) may be labeled as medium quality steam (or another label), and a third range of steam quality values (e.g., >70%) may be labeled as high quality steam (or another label). In some alternative embodiments, the more or fewer than three steam quality labels and different ranges of steam quality values may be used.

At step 1010, the method 1000 may include estimating a steam quality label of a fluid flowing through the device 100 using the trained SVM classification model, where the flow conditions may be unknown. In general, step 1010 may be performed in a similar manner as described with respect to step 910 of the method 900.

In some example embodiments, functions other than MATLAB functions may be used to generate a trained classification model. In some example embodiments, the method 1000 may include more steps than described above without departing from the scope of this disclosure. In some example embodiments, one or more of the steps of the method 1000 may be performed in a different order than described above without departing from the scope of this disclosure. As described above, machine learning may be leveraged to create a classification model that ultimately enables estimation of the steam quality from ultrasound measurements collected with the transducers of the acoustic sensor device 100 that are in the pitch-catch configuration. In some alternative embodiments, the method 1000 may be performed with an acoustic sensor device other than the acoustic sensor device 100 without departing from the scope of this disclosure.

Figure 11:
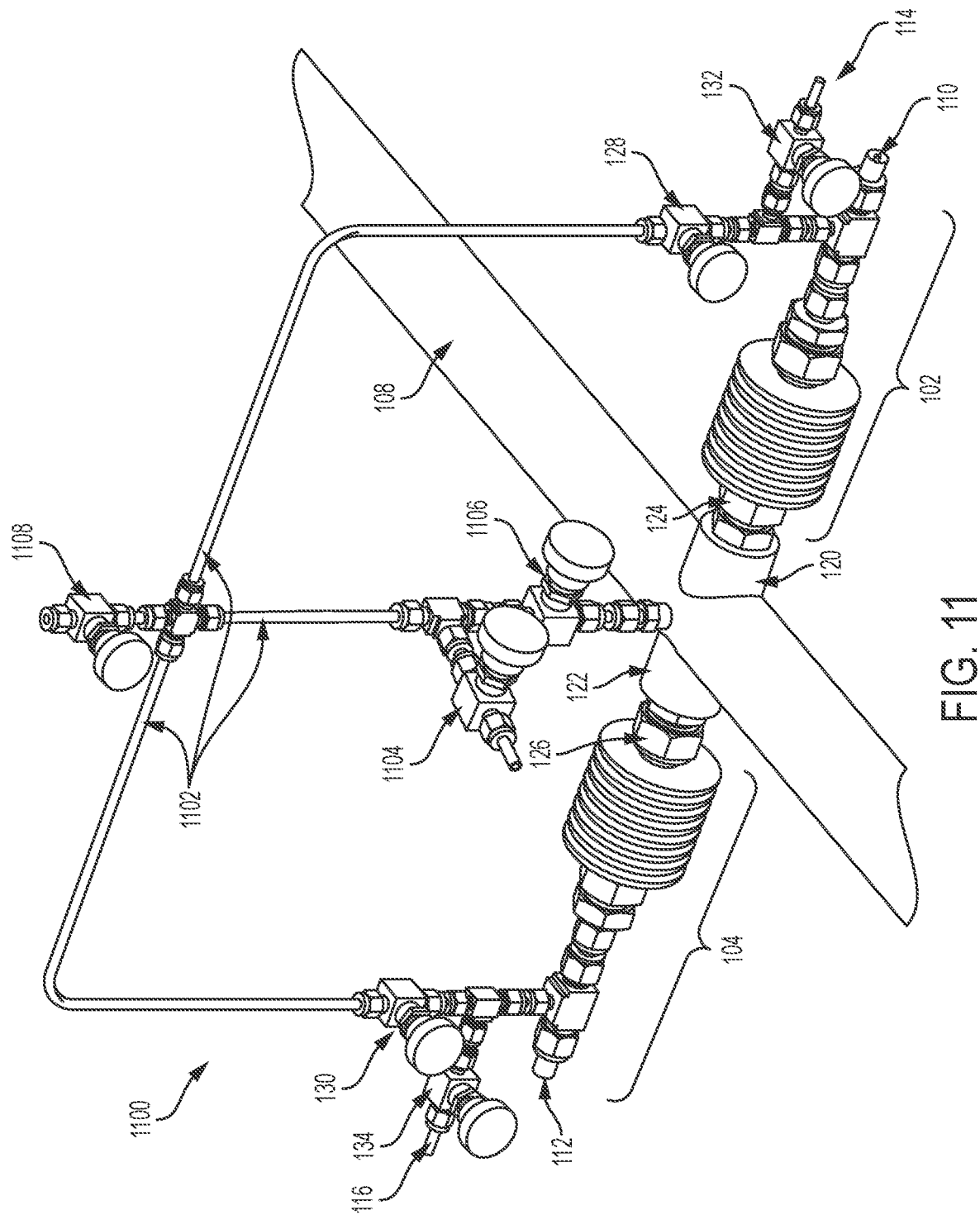
FIG. 11 illustrates an acoustic sensor device for measuring the acoustic properties of a multiphase fluid flowing through a pipe according to another example embodiment.

FIG. 11 illustrates an acoustic sensor device 1100 for measuring the acoustic properties of a multiphase fluid flowing through the pipe 108 according to another example embodiment. The acoustic sensor device 1100 is substantially the same and operates in substantially the same way as the acoustic sensor device 100 of FIG. 1.

Focusing on the primary differences between the two devices, in some example embodiments, the acoustic sensor device 1100 may include a pressure compensator 1102 that includes valves 1104, 1106, 1108 as well as the valves 128, 130, 132, and 134 described with respect to the acoustic sensor device 100.

In some example embodiments, the heat transfer fluid described above may be put in the pressure compensator 1102 through a valve 1108 after air is removed from the pressure compensator 1102 through a valve 1104 using, for example, a vacuum pump. For example, the valves 128, 130, 1106, and 1108 may be closed, and the valve 1104 may be opened to remove air from the pressure compensator 1102. After air is removed from the pressure compensator 1102 through the valve 1104, the valve 1104 may be closed and the valve 1108 may be opened to fill the pressure compensator 1102 with the heat transfer fluid. After the pressure compensator 1102 is filled, the valves 1104, 1108 may be closed and the valves 128, 130, 1106 may be opened to establish a fluid passageway between the acoustic transmitter 102, the acoustic receiver 104, and the pipe 108 through the piping of the pressure compensator 1102.

In general, the acoustic sensor device 1100 may be used in place of the acoustic sensor device 100 in embodiments and operations described in this specification.

Figure 12:
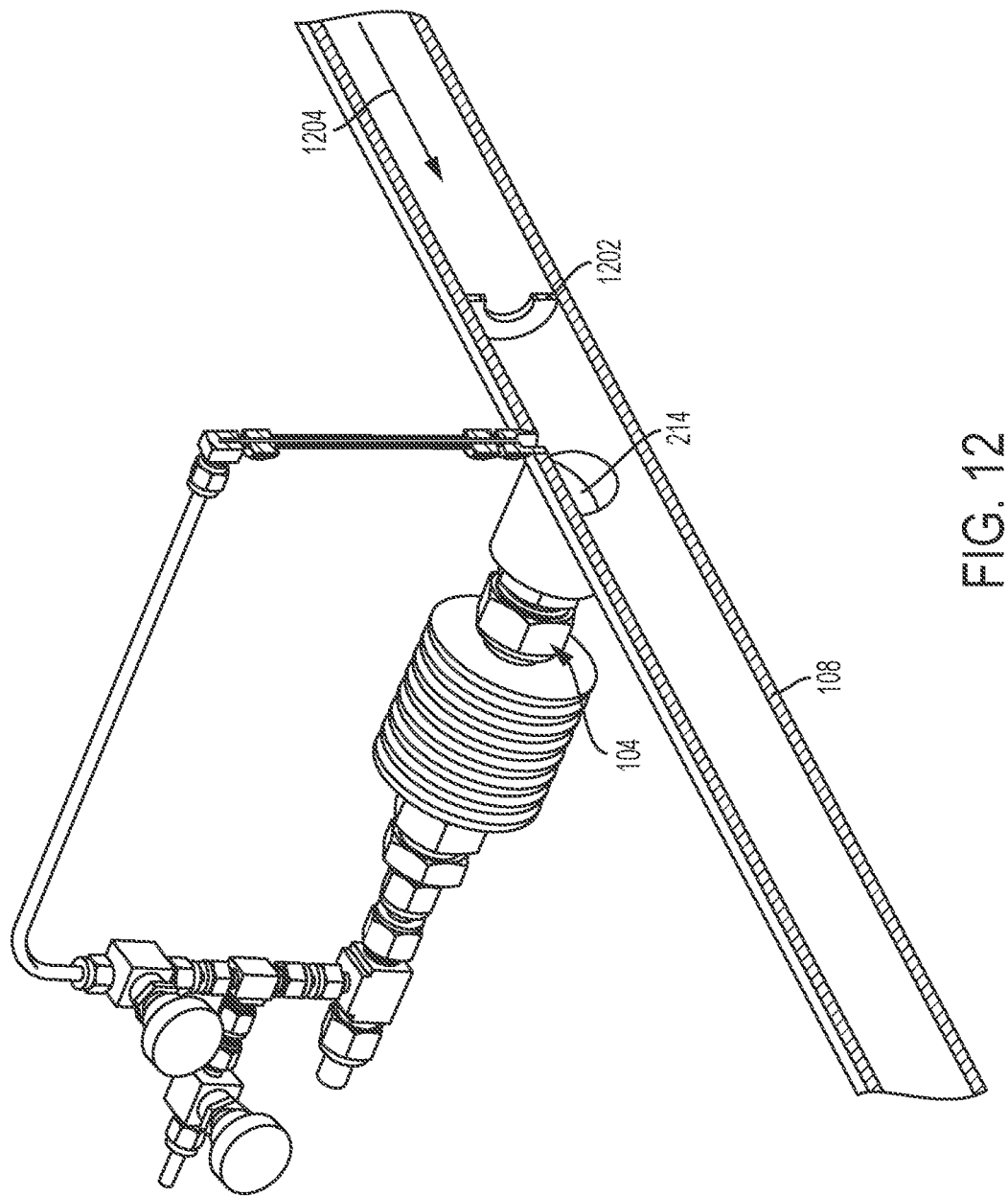
FIG. 12 illustrates a cross-section of the pipe of the acoustic sensor devices of FIGS. 1 and 11 according to an example embodiment.

FIG. 12 illustrates a cross-section of the pipe 108 of the acoustic sensor devices 100, 1100 according to an example embodiment. In some example embodiments, the pipe 108 may include an orifice 1202 disposed in the interior space of the pipe 108. For example, the orifice 1202 may be located to de-stratify the multiphase fluid flowing through the pipe 108 in the direction shown by the arrow 1204. To illustrate, the fluid flowing through the pipe 108 may be stratified before reaching the orifice 1202. The orifice 1202 may help reduce the stratification of the multiphase fluid, which may help in estimating the steam quality of the multiphase fluid using the acoustic sensor devices 100, 1100.

In some alternative embodiments, the orifice 1202 may be omitted. For example, stratification of the multiphase fluid may be insignificant, for example, depending on the location of the acoustic sensor devices 100, 1100. In some alternative embodiments, other de-stratification means may be used to de-stratify the multiphase fluid.

Figure 13:
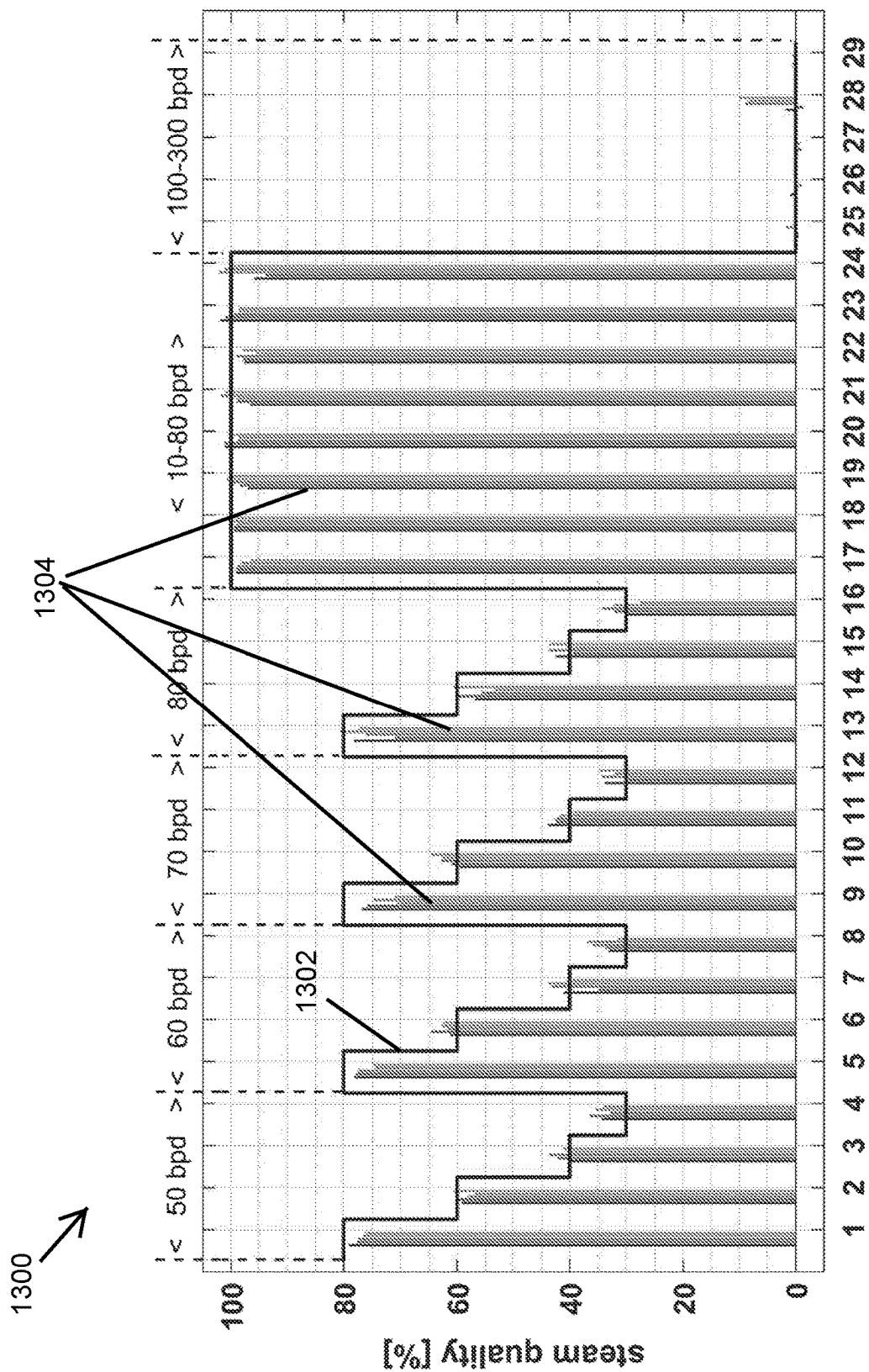
FIG. 13 illustrates a graph of steam quality values estimated using a trained regression model of FIG. 9 and corresponding nominal steam quality values according to an example embodiment.

FIG. 13 illustrates a graph 1300 of steam quality values estimated using a trained regression model of FIG. 9 and corresponding nominal steam quality values according to an example embodiment. The solid line 1302 shows the nominal steam quality values for 29 test data sets. The test data sets 1-4 are generated for flow conditions at 80%, 60%, 40% and 30% steam quality with a vapor flow rate of 50 barrels per day (bpd). The test data sets 5-16 are generated for flow conditions at 80%, 60%, 40% and 30% steam quality with vapor flow rates of 60, 70 and 80 bpd. The test data sets 17-24 are generated for single-phase flow conditions at 100% quality with vapor flow rates increasing from 10 to 80 bpd with increments of 10 bpd. The test data sets 25-29 are generated for single-phase flow conditions at 0% quality with liquid flow rates increasing from 100 to 300 bpd with increments of 50 bpd.

Each of the twenty nine test data sets consists of 5 measurements. The estimated steam quality values obtained for each measurement of the test data sets are represented with bars 1304 in the bar plot of FIG. 13. The steam quality values estimated by the trained SVM model as represented by the bars 1304 are in good agreement with the nominal steam quality values of each test data set (i.e. solid line). The difference between the predicted and nominal steam quality values are generally with a 10% range.

Although some embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

The invention claimed is:

1. An acoustic sensor device, comprising:
an acoustic transmitter comprising a transmitter piezoelectric transducer (PZT), a transmitter plate, and a transmitter standoff positioned between the transmitter PZT and the transmitter plate; and
an acoustic receiver comprising a receiver PZT, a receiver plate, and a receiver standoff positioned between the receiver PZT and the receiver plate, wherein the acoustic transmitter and the acoustic receiver are each designed to be attached to a pipe such that the transmitter plate and the receiver plate are exposed to an interior space of the pipe through openings in a wall of the pipe.

2. The device of claim 1, wherein:
the transmitter PZT and the transmitter standoff are positioned inside a transmitter tube of the acoustic transmitter,
the transmitter plate is attached to the transmitter tube enclosing an opening of the transmitter tube,
the receiver PZT and the receiver standoff are positioned inside a receiver tube of the acoustic receiver, and
the receiver plate is attached to the receiver tube enclosing an opening of the receiver tube.

3. The device of claim 2, wherein:
a transmitter spring of the acoustic transmitter is disposed inside an interior space of the transmitter tube,
the transmitter PZT is held against the transmitter standoff and the transmitter standoff is held against the transmitter plate by a decompression force exerted by the transmitter spring on the transmitter PZT,
a receiver spring of the acoustic receiver is disposed inside an interior space of the receiver tube, and
the receiver PZT is held against the receiver standoff and the receiver standoff is held against the receiver plate by a decompression force exerted by the receiver spring on the receiver PZT.

4. The device of claim 3, wherein:
the transmitter spring and the transmitter PZT are positioned inside a transmitter cage structure of the acoustic transmitter, and
the receiver spring and the receiver PZT are positioned inside a receiver cage structure of the acoustic receiver.

5. The device of claim 4, wherein:
transmitter spacers of the acoustic transmitter are positioned between the transmitter cage structure and the transmitter tube to dampen transfer of acoustic vibration from the transmitter PZT to the transmitter tube, and
receiver spacers of the acoustic receiver are positioned between the receiver cage structure and the receiver tube to dampen transfer of acoustic vibration from the receiver PZT to the receiver tube.

6. The device of claim 2, wherein:
an interior space of the transmitter tube contains a first heat transfer fluid that facilitates acoustic coupling between the transmitter PZT, the transmitter standoff, and the transmitter plate, and
an interior space of the receiver tube contains a second heat transfer fluid that facilitates acoustic coupling between the receiver PZT, the receiver standoff, and the receiver plate.

7. The device of claim 2, wherein:
the transmitter tube includes a transmitter heat sink external to the transmitter tube to dissipate heat away from the transmitter tube, and
the receiver tube includes a receiver heat sink external to the receiver tube to dissipate heat away from the receiver tube.

8. The device of claim 6, further comprising a pressure compensator coupled to the acoustic transmitter and the acoustic receiver to balance a pressure on the transmitter plate and the receiver plate, wherein the pressure compensator is designed to be coupled to the pipe.

9. An acoustic sensor device, comprising:
a pipe;
an acoustic transmitter comprising a transmitter piezoelectric transducer (PZT), a transmitter plate, and a transmitter standoff positioned between the transmitter PZT and the transmitter plate; and
an acoustic receiver comprising a receiver PZT, a receiver plate, and a receiver standoff positioned between the receiver PZT and the receiver plate,
wherein:
the transmitter plate is exposed to an interior space of the pipe through a first opening in a wall of the pipe,
the receiver plate is exposed to the interior of the pipe through a second opening in the wall of the pipe, and
the first opening and the second opening are across from each other.

10. The device of claim 9, wherein:
an acoustic wave generated by the transmitter PZT is transferred to the transmitter plate through the transmitter standoff,
the receiver plate is positioned to receive an acoustic vibration from the transmitter plate across the interior space of the pipe, and
the receiver plate is designed to transfer the acoustic vibration to the receiver PZT through the receiver standoff.

11. The device of claim 9, wherein:
the transmitter PZT and the transmitter standoff are positioned inside a transmitter tube of the acoustic transmitter,
the transmitter plate is attached to the transmitter tube enclosing an opening of the transmitter tube,
the receiver PZT and the receiver standoff are positioned inside a receiver tube of the acoustic receiver, and
the receiver plate is attached to the receiver tube enclosing an opening of the receiver tube.

12. The device of claim 11, wherein:
a transmitter spring of the acoustic transmitter is disposed inside an interior space of the transmitter tube,
the transmitter PZT is held against the transmitter standoff and the transmitter standoff is held against the transmitter plate by a decompression force exerted by the transmitter spring on the transmitter PZT,
a receiver spring of the acoustic receiver is disposed inside an interior space of the receiver tube, and
the receiver PZT is held against the receiver standoff and the receiver standoff is held against the receiver plate by a decompression force exerted by the receiver spring on the receiver PZT.

13. The device of claim 12, wherein:
the transmitter spring and the transmitter PZT are positioned inside a transmitter cage structure of the acoustic transmitter, and
the receiver spring and the receiver PZT are positioned inside a receiver cage structure of the acoustic receiver.

14. The device of claim 11, wherein:
an interior space of the transmitter tube contains a first heat transfer fluid that facilitates acoustic coupling between the transmitter PZT, the transmitter standoff, and the transmitter plate, and
an interior space of the receiver tube contains a second heat transfer fluid that facilitates acoustic coupling between the receiver PZT, the receiver standoff, and the receiver plate.

15. The device of claim 11, further comprising a first branch connection and a second branch connection, wherein the first branch connection is attached to the pipe at the first opening of the pipe, wherein a first fitting is attached to the first branch connection, wherein the transmitter plate is positioned inside the first fitting, wherein the second branch connection is attached to the pipe at the second opening of the pipe, wherein a second fitting is attached to the second branch connection, and wherein the receiver plate is positioned inside the second fitting.

16. The device of claim 11, further comprising a pressure compensator coupled to the acoustic transmitter, to the acoustic receiver, and to the pipe to balance a pressure on the transmitter plate and the receiver plate.

17. A system for characterizing a multiphase fluid flowing through a pipe, the system comprising:
a digital function generator;
a power amplifier with a first controllable gain;
a preamplifier with a second controllable gain;
a digital oscilloscope;
a computer configured to execute a software code to manage communication with the digital function generator and the digital oscilloscope and to implement signal post-processing techniques for extraction of information from recorded signals to characterize a multiphase fluid; and
an acoustic sensor device comprising:
a pipe;
an acoustic transmitter comprising:
a transmitter piezoelectric transducer (PZT), a transmitter plate, and a transmitter standoff positioned between the transmitter PZT and the transmitter plate; and
an acoustic receiver comprising a receiver PZT, a receiver plate, and a receiver standoff positioned between the receiver PZT and the receiver plate,
wherein:
the transmitter plate is exposed to an interior space of the pipe through a first opening in a wall of the pipe,
the receiver plate is exposed to the interior of the pipe through a second opening in the wall of the pipe,
the digital function generator provides a first electrical signal to the transmitter PZT,
the digital oscilloscope receives a second electrical signal from the receiver PZT,
the first electrical signal is amplified by the power amplifier prior to being provided to the transmitter PZT, and
the second electrical signal from the receiver PZT is amplified by the preamplifier.

18. The system of claim 17, wherein:
the transmitter PZT and the transmitter standoff are positioned inside a transmitter tube of the acoustic transmitter,
the transmitter plate is attached to the transmitter tube enclosing an opening of the transmitter tube,
the receiver PZT and the receiver standoff are positioned inside a receiver tube of the acoustic receiver, and
the receiver plate is attached to the receiver tube enclosing an opening of the receiver tube.

19. The system of claim 18, wherein:
a transmitter spring of the acoustic transmitter is disposed inside an interior space of the transmitter tube,
the transmitter PZT is held against the transmitter standoff and the transmitter standoff is held against the transmitter plate by a decompression force exerted by the transmitter spring on the transmitter PZT,
a receiver spring of the acoustic receiver is disposed inside an interior space of the receiver tube, and
the receiver PZT is held against the receiver standoff and the receiver standoff is held against the receiver plate by a decompression force exerted by the receiver spring on the receiver PZT.

20. The system of claim 18, wherein:
an interior space of the transmitter tube contains a first heat transfer fluid that facilitates acoustic coupling between the transmitter PZT, the transmitter standoff, and the transmitter plate, and
an interior space of the receiver tube contains a second heat transfer fluid that facilitates acoustic coupling between the receiver PZT, the receiver standoff, and the receiver plate.

* * * * *